United States Patent
Chisaka et al.

(10) Patent No.: US 11,926,681 B2
(45) Date of Patent: Mar. 12, 2024

(54) CURABLE COMPOSITION, CURED PRODUCT, AND METHOD FOR PRODUCING CURED PRODUCT

(71) Applicant: TOKYO OHKA KOGYO CO., LTD., Kawasaki (JP)

(72) Inventors: Hiroki Chisaka, Kawasaki (JP); Shinsuke Kawatsu, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 0 days.

(21) Appl. No.: 17/837,415

(22) Filed: Jun. 10, 2022

(65) Prior Publication Data
US 2023/0002520 A1 Jan. 5, 2023

(30) Foreign Application Priority Data
Jun. 14, 2021 (JP) ................. 2021-098716

(51) Int. Cl.
| | |
|---|---|
| C08F 2/46 | (2006.01) |
| C08F 2/50 | (2006.01) |
| C08F 18/10 | (2006.01) |
| C08F 36/14 | (2006.01) |
| C08G 61/04 | (2006.01) |
| C08K 3/22 | (2006.01) |
| B33Y 70/00 | (2020.01) |

(52) U.S. Cl.
CPC .............. C08F 18/10 (2013.01); C08F 36/14 (2013.01); C08K 3/22 (2013.01); B33Y 70/00 (2014.12); C08K 2003/2244 (2013.01); C08K 2201/011 (2013.01)

(58) Field of Classification Search
CPC ...... C08K 3/22; C08K 9/06; C08K 2201/011; C08K 2003/2244; C08K 5/5425; C08F 36/14; C08F 18/10; B33Y 70/10; B33Y 70/00

USPC ................. 522/64, 6, 189, 184, 71, 1; 520/1
See application file for complete search history.

(56) References Cited

U.S. PATENT DOCUMENTS

2022/0325127 A1* 10/2022 Chisaka ................. C09D 11/38

FOREIGN PATENT DOCUMENTS

JP 2017-214465 A 12/2017

* cited by examiner

*Primary Examiner* — Jessica Whiteley
(74) *Attorney, Agent, or Firm* — Knobbe, Martens, Olson & Bear, LLP

(57) ABSTRACT

A curable composition capable of forming a cured product having a high refractive index and suppressed increase in reflectance, a cured product of the curable composition, and a method for producing the cured product using the curable composition. The curable composition includes a photopolymerizable monomer, metal oxide nanoparticles, and a photopolymerization initiating agent. The photopolymerizable monomer includes a compound represented by the following formula (a1). In the formula, $R^1$ and $R^2$ each independently represents a single bond or an alkylene group, $R^3$ represents an alkyl group, an alkenyl group, an alkoxy group, or a hydroxy group, and n represents 0 or 1

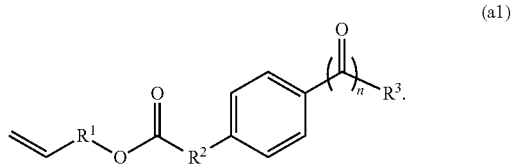

(a1)

9 Claims, No Drawings

CURABLE COMPOSITION, CURED PRODUCT, AND METHOD FOR PRODUCING CURED PRODUCT

RELATED APPLICATIONS

This application claims priority to Japanese Patent Application No. 2021-098716, filed Jun. 14, 2021, the entire content of which is incorporated herein by reference.

BACKGROUND OF THE INVENTION

Field of the Invention

The present invention relates to a curable composition, a cured product of the curable composition, and a method for producing the cured product using the curable composition.

Related Art

Conventionally, for forming an optical member, a high refractive index material has been used. For example, for the high refractive index material, a composition obtained by dispersing particles of metal oxide such as titanium oxide and zirconium oxide in an organic component is used. As compositions for forming such a high refractive index material, an energy ray curable composition containing metal oxide (A) having a specific particle diameter, (meth)acrylate (B), and a photopolymerization initiating agent (C) is proposed (see, Patent Document 1).

Patent Document 1: Japanese Unexamined Patent Application, Publication No. 2017-214465

SUMMARY OF THE INVENTION

However, in the high refractive index material obtained by curing a conventional curable composition as described in Patent Document 1, reflectance is easily increased, and visibility is easily deteriorated in use for a display and the like.

The present invention has been made in view of such conventional circumstances, and has an object to provide a curable composition capable of forming a cured product having a high refractive index and suppressed increase in reflectance, a cured product of the curable composition, and a method for producing the cured product using the curable composition.

The present inventors have found that the above-mentioned problems can be solved by allowing a curable composition including a photopolymerizable monomer (A), metal oxide nanoparticles (B), and a photopolymerization initiating agent (C), to contain a compound having a specific structure as the photopolymerizable monomer (A) and thereby, have completed the present invention. More specifically, the present invention provides the following.

A first aspect of the present invention is a curable composition including a photopolymerizable monomer (A), metal oxide nanoparticles (B), and a photopolymerization initiating agent (C), in which the photopolymerizable monomer (A) is a curable composition including a compound represented by the following formula (a1):

[Chem. 1]

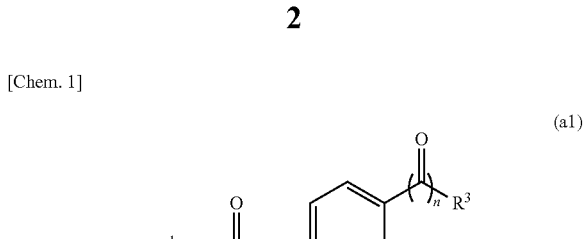

(a1)

(in the above formula, $R^1$ and $R^2$ each independently represents a single bond or an alkylene group, $R^3$ represents an alkyl group, an alkenyl group, an alkoxy group, or a hydroxy group, and n represents 0 or 1).

A second aspect of the present invention is a cured product of the curable composition according to the first aspect.

A third aspect of the present invention is a method for producing a cured product, the method including forming the curable composition according to the first aspect; and exposing the formed curable composition to light.

The present invention can provide a curable composition capable of forming a cured product having a high refractive index and suppressed increase in reflectance, a cured product of the curable composition, and a method for producing the cured product using the curable composition.

DETAILED DESCRIPTION OF THE INVENTION

<Curable Composition>

A curable composition includes a photopolymerizable monomer (A), metal oxide nanoparticles (B), and a photopolymerization initiating agent (C). The photopolymerizable monomer (A) includes a compound represented by the above formula (a1). When the curable composition including a photopolymerizable monomer (A), metal oxide nanoparticles (B), and a photopolymerization initiating agent (C) contains a compound represented by the above formula (a1) as the photopolymerizable monomer (A), it is possible to obtain a curable composition capable of forming a cured product having a high refractive index and suppressed increase in reflectance.

In the specification and claims of the present application, "(meth)acrylate" means both acrylate and methacrylate. In the specification and claims of the present application, "(meth)acrylic" means both acrylic and methacrylic. In the specification and claims of the present application, "(meth)acryloyl" means both acryloyl and methacryloyl. In the specification and claims of the present application, "acrylic monomer" means a monomer including at least one selected from an acryloyl group and a methacryloyl group.

The curable composition may include a solvent (S). From the viewpoint of, for example, suppressing reduction of the strength of a cured product by the solvent (S) in formation of the cured product, the curable composition preferably includes a small amount of the solvent (S) or includes no solvent (S). The content of the solvent (S) of the curable composition is preferably 5% by mass or less, more preferably 3% by mass or less, further preferably 2% by mass or less, still further preferably 1% by mass or less, particularly preferably 0.5% by mass or less, and most preferably 0.3% by mass or less. The lower limit value of the content of the solvent (S) in the curable composition is not particularly limited, and the value is preferably 0% by mass or more. In particular, it is the most preferable that the curable composition includes substantially no solvent (S). A curable composition including substantially no solvent (S) means that a very small amount of solvent (S) is inevitably introduced into the curable composition accompanying the raw material or the like, and that no solvent (S) is intentionally added to the curable composition. The content of the solvent (S) in the curable composition when the curable composition includes substantially no solvent (S) is not particularly limited, and the content is, for example, 0.2% by mass or less, preferably 0.15% by mass or less, more preferably 0.1% by mass or less, and further preferably 0.05% by mass or less.

The viscosity of the curable composition is not particularly limited, but the viscosity measured at 25° C. using an E-type viscometer is preferably 70 cP or less, more preferably 60 cP or less, and further preferably 50 cP or less. The viscosity of the curable composition can be adjusted, for example, by adjusting the content of a plasticizing agent (D), adjusting the content of the photopolymerizable monomer (A) or the metal compound particles (B), adding a small amount of solvent (S) to the curable composition, or the like.

Hereinafter, essential components and optional components included in the curable resin composition are described.

[Photopolymerizable Monomer (A)]

The curable composition includes a photopolymerizable monomer (A).

The photopolymerizable monomer (A) includes a compound represented by the following formula (a1):

[Chem. 2]

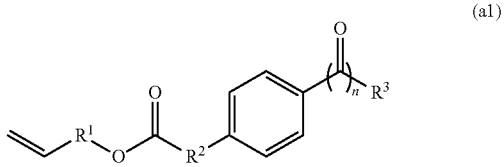

(a1)

(in the formula, $R^1$ and $R^2$ each independently represents a single bond or an alkylene group, $R^3$ represents an alkyl group, an alkenyl group, an alkoxy group, or a hydroxy group, and n represents 0 or 1).

As a result, a cured product having a high refractive index and suppressed increase in reflectance can be formed. One type of the compound represented by the above formula (a1) may be used, or two or more thereof may be used in combination.

In the above formula (a1), an alkylene group as $R^1$ and $R^2$ may be linear or branched, and examples thereof include an alkylene group having 1 or more and 6 or less carbon atoms, such as a methylene group, an ethylene group, a propylene group, a tetramethylene group, an ethylethylene group, a pentamethylene group, and a hexamethylene group. From the viewpoint of suppressing increase in reflectance and the like, an alkylene group having 1 or more and 4 or less carbon atoms is preferable, an alkylene group having 1 or more and 3 or less carbon atoms is more preferable, and an alkylene group having 1 or 2 carbon atoms is further preferable. $R^1$ and $R^2$ may be the same as or different from each other. From the viewpoint of suppressing increase in reflectance, $R^1$ and $R^2$ are preferably a single bond.

In the above formula (a1), an alkyl group as $R^3$ may be linear or branched, and examples thereof include an alkyl group having 1 or more and 12 or less carbon atoms, such as, a methyl group, an ethyl group, a propyl group, an isopropyl group, a butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an n-octyl group. From the viewpoint of suppressing increase in reflectance, an alkyl group having 1 or more and 8 or less carbon atoms is preferable, an alkyl group having 1 or more and 6 or less carbon atoms is more preferable, and an alkyl group having 1 or more and 4 or less carbon atoms is further preferable.

In the above formula (a1), an alkenyl group as $R^3$ may be linear or branched, examples thereof include alkenyl groups having 2 or more and 12 or less carbon atoms, such as a vinyl group, an isopropenyl group, and an allyl group. From the viewpoint of suppressing increase in reflectance, an alkenyl group having 2 or more and 8 or less carbon atoms is preferable, an alkenyl group having 2 or more and 6 or less carbon atoms is more preferable, and an alkenyl group having 2 or more and 4 or less carbon atoms are further preferable.

In the above formula (a1), an alkoxy group as $R^3$ may be linear or branched, and examples thereof include alkoxy groups having 1 or more and 12 or less carbon atoms, such as a methoxy group and an ethoxy group. From the viewpoint of suppressing increase in reflectance, an alkoxy group having 1 or more and 8 or less carbon atoms is preferable, an alkoxy group having 1 or more and 6 or less carbon atoms is more preferable, and an alkoxy group having 1 or more and 4 or less carbon atoms is further preferable.

From the viewpoint of suppressing increase in reflectance, $R^3$ is preferably an alkyl group or an alkenyl group, and particularly preferably an ethyl group, an isopropyl group, a t-butyl group, a vinyl group, or an isopropenyl group.

From the viewpoint of suppressing increase in reflectance, n preferably represents 0.

A specific example of the compound represented by the above formula (a1) is as follows, but it is not limited thereto.

[Chem. 3]

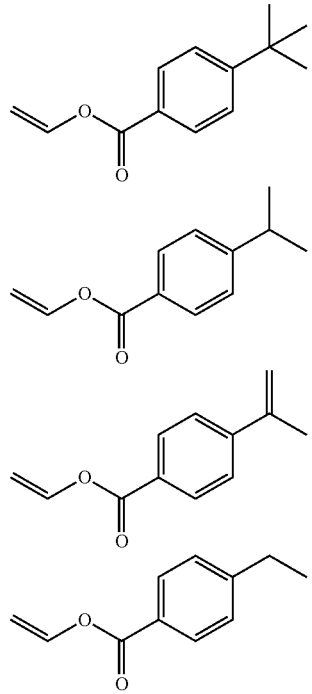

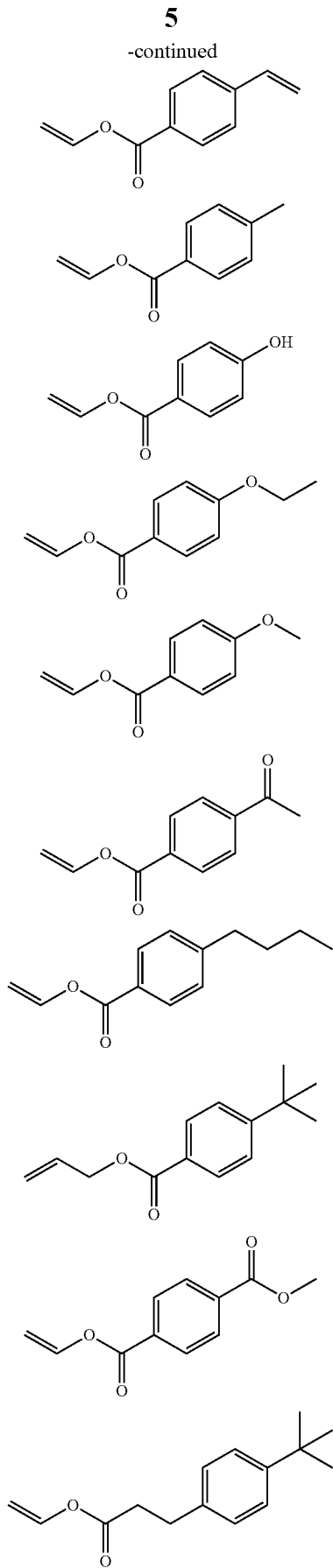

The photopolymerizable monomer (A) may include an acrylic monomer in addition to the compound represented by the above formula (a1). Examples of the acrylic monomer include a polyfunctional acrylic monomer (A1) having three or more (meth)acryloyl groups (hereinafter, also referred to as "trifunctional or more acrylic monomer (A1)"), a polyfunctional acrylic monomer having two (meth)acryloyl groups (hereinafter, also referred to as "bifunctional acrylic monomer (A2)"), and a monofunctional acrylic monomer having one (meth)acryloyl group (hereinafter, also referred to as "monofunctional acrylic monomer (A3)"). Hereinafter, the trifunctional or more acrylic monomer (A1) and the bifunctional acrylic monomer (A2) may be generically referred to as "polyfunctional acrylic monomer").

The percentage of the mass of acrylic monomer with respect to the mass of the photopolymerizable monomer (A) is preferably 0% by mass or more, more preferably 5% by mass or more, further preferably 10% by mass or more, and particularly preferably 15% by mass or more. The upper limit of the above percentage is, for example, preferably 50% by mass or less, more preferably 40% by mass or less, further preferably 30% by mass or less, and particularly preferably 25% by mass or less.

Note here that the percentage of the compound represented by the above formula (a1) with respect to the mass of the photopolymerizable monomer (A) is preferably 50% by mass or more, more preferably 60% by mass or more, further preferably 70% by mass or more, and particularly preferably 75% by mass or more. The upper limit of the above percentage is, for example, preferably 100% by mass or less, more preferably 95% by mass or less, further preferably 90% by mass or less, and particularly preferably 85% by mass or less.

When the photopolymerizable monomer (A) includes, in particular, a trifunctional or more acrylic monomer (A1), it is possible to form a cured product in which localization of metal oxide nanoparticles (B) is suppressed. In terms of easily obtaining a cured product having high transparency and easily suppressing localization of the metal oxide nanoparticles (B) in the cured product, a trifunctional or more acrylic monomer (A1) is preferably an aliphatic compound having no aromatic group. In terms of curability of the curable composition or suppressing of the localization of the metal oxide nanoparticles (B) in the cured product, the number of (meth)acryloyl groups included in the trifunctional or more acrylic monomer (A1) is preferably 3 or more and 6 or less.

Specific suitable examples of the trifunctional or more acrylic monomer (A1) include trimethylolpropane tri(meth)acrylate, glycerine tri(meth)acrylate, pentaerythritol tri(meth)acrylate, pentaerythritol tetra(meth)acrylate, dipentaerythritol penta(meth)acrylate, dipentaerythritol hexa(meth)acrylate, glycerine polyglycidyl ether poly(meth)acrylate, and a condensed product of polyvalent alcohol and N-methylol(meth)acrylamide, and the like.

Furthermore, the trifunctional or more acrylic monomer (A1) preferably includes a compound represented by the following formula (a2), or a compound represented by the following formula (a3).

[Chem. 4]

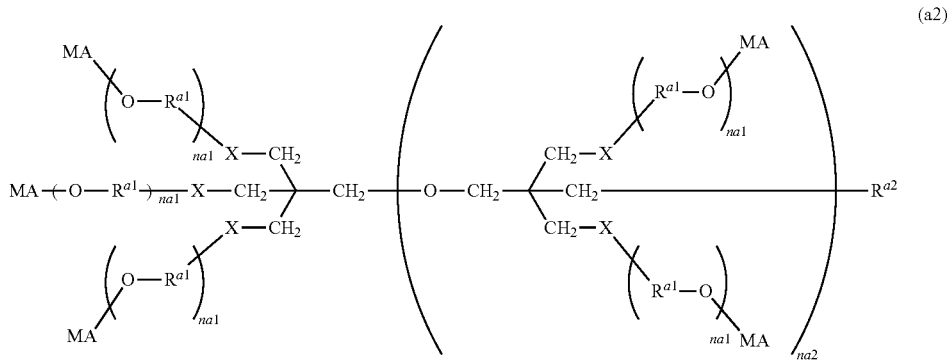

(a2)

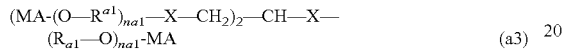

(a3)

(In the formulae (a2) and (a3), MA each independently is a (meth)acryloyl group; X each independently is an oxygen atom, —NH—, or —N(CH$_3$)—; R$^{a1}$ each independently is an ethane-1,2-diyl group, propane-1,2-diyl group, or propane-1,3-diyl group; R$^{a2}$ is a hydroxyl group, an alkyl group having 1 or more and 4 or less carbon atoms, or a group represented by —X—(R$^{a1}$—O)$_{na1}$-MA (X is the same as the above); and na1 and na2 each independently is 0 or 1)

In the formula (a2), examples of the alkyl group having 1 or more and 4 or less carbon atoms as R$^{a2}$ include a methyl group, an ethyl group, an n-propyl group, an isopropyl group, an n-butyl group, an isobutyl group, a sec-butyl group, and a tert-butyl group. Among these alkyl groups, a methyl group, and an ethyl group are preferable.

Preferable examples of the compound represented by the formula (a2) and the compound represented by the formula (a3) compound include pentaerythritol tetra(meth)acrylate, dipentaerythritol hexa (meth)acrylate, trimethylolpropane tri(meth)acrylate, glycerine tri(meth)acrylate, and compounds represented by the following 1) to 32). In the compounds 1) to 32), MA is a (meth)acryloyl group.

1) (MA-NH—CH$_2$)$_4$—C
2) (MA-N(CH$_3$)—CH$_2$)$_4$—C
3) (MA-O—CH$_2$CH$_2$CH$_2$—O—CH$_2$)$_4$—C
4) (MA-O—CH$_2$CH$_2$—O—CH$_2$)$_4$—C
5) (MA-O—CH$_2$CH$_2$CH$_2$—NH—CH$_2$)$_4$—C
6) (MA-O—CH$_2$CH$_2$—NH—CH$_2$)$_4$—C
7) (MA-O—CH$_2$CH$_2$CH$_2$—N(CH$_3$)—CH$_2$)$_4$—C
8) (MA-O—CH$_2$CH$_2$—N(CH$_3$)—CH$_2$)$_4$—C
9) (MA-NH—CH$_2$)$_3$—C—CH$_2$—O—CH$_2$—C—(CH$_2$—NH-MA)$_3$
10) (MA-N(CH$_3$)—CH$_2$)$_3$—C—CH$_2$—O—CH$_2$—C—(CH$_2$—N(CH$_3$)-MA)$_3$
11) (MA-O—CH$_2$CH$_2$CH$_2$—O—CH$_2$)$_3$—C—CH$_2$—O—CH$_2$—C—(CH$_2$—O—CH$_2$CH$_2$CH$_2$—O-MA)$_3$
12) (MA-O—CH$_2$CH$_2$—O—CH$_2$)$_3$—C—CH$_2$—O—CH$_2$—C—(CH$_2$—O—CH$_2$CH$_2$—O-MA)$_3$
13) (MA-O—CH$_2$CH$_2$CH$_2$—NH—CH$_2$)$_3$—C—CH$_2$—O—CH$_2$—C—(CH$_2$—NH—CH$_2$CH$_2$CH$_2$—O-MA)$_3$
14) (MA-O—CH$_2$CH$_2$—NH—CH$_2$)$_3$—C—CH$_2$—O—CH$_2$—C—(CH$_2$—NH—CH$_2$CH$_2$—O-MA)$_3$
15) (MA-O—CH$_2$CH$_2$CH$_2$—N(CH$_3$)—CH$_2$)$_3$—C—CH$_2$—O—CH$_2$—C—(CH$_2$—N(CH$_3$)—CH$_2$CH$_2$CH$_2$—O-MA)$_3$
16) (MA-O—CH$_2$CH$_2$—N(CH$_3$)—CH$_2$)$_3$—C—CH$_2$—O—CH$_2$—C—(CH$_2$—N(CH$_3$)—CH$_2$CH$_2$—O-MA)$_3$
17) (MA-NH—CH$_2$)$_2$—CH—NH-MA
18) (MA-N(CH$_3$)—CH$_2$)$_2$—CH—N(CH$_3$)-MA
19) (MA-O—CH$_2$CH$_2$CH$_2$—O—CH$_2$)$_2$—CH—O—CH$_2$CH$_2$CH$_2$—O-MA
20) (MA-O—CH$_2$CH$_2$—O—CH$_2$)$_2$—CH—C—O—CH$_2$CH$_2$—O-MA
21) (MA-O—CH$_2$CH$_2$CH$_2$—NH—CH$_2$)$_2$—CH—NH—CH$_2$CH$_2$CH$_2$—O-MA
22) (MA-O—CH$_2$CH$_2$—NH—CH$_2$)$_2$—CH$_2$—NH—CH$_2$CH$_2$—O-MA
23) (MA-O—CH$_2$CH$_2$CH$_2$—N(CH$_3$)—CH$_2$)$_2$—CH$_2$—N(CH$_3$)—CH$_2$CH$_2$CH$_2$—O-MA
24) (MA-O—CH$_2$CH$_2$—N(CH$_3$)—CH$_2$)$_2$—CH$_2$—N(CH$_3$)—CH$_2$CH$_2$—O-MA
25) (MA-NH—CH$_2$)$_3$—C—CH$_2$CH$_3$
26) (MA-N(CH$_3$)—CH$_2$)$_3$—C—CH$_2$CH$_3$
27) (MA-O—CH$_2$CH$_2$CH$_2$—O—CH$_2$)$_3$—C—CH$_2$CH$_3$
28) (MA-O—CH$_2$CH$_2$—O—CH$_2$)$_3$—C—CH$_2$CH$_3$
29) (MA-O—CH$_2$CH$_2$CH$_2$—NH—CH$_2$)$_3$—C—CH$_2$CH$_3$
30) (MA-O—CH$_2$CH$_2$—NH—CH$_2$)$_3$—C—CH$_2$CH$_3$
31) (MA-O—CH$_2$CH$_2$CH$_2$—N(CH$_3$)—CH$_2$)$_3$—C—CH$_2$CH$_3$
32) (MA-O—CH$_2$CH$_2$—N(CH$_3$)—CH$_2$)$_3$—C—CH$_2$CH$_3$

In terms of suppressing localization of the metal oxide nanoparticles (B) in the cured product, the percentage of the mass of the trifunctional or more acrylic monomer (A1) with respect to the mass of the photopolymerizable monomer (A) is preferably 0% by mass or more, more preferably 5% by mass or more, further more preferably 10% by mass or more, and particularly preferably 15% by mass or more. The upper limit of the above percentage is, for example, preferably 50% by mass or less, more preferably 40% by mass or less, further 30% by mass or less, and particularly preferably 25% by mass or less.

Examples of the bifunctional acrylic monomer (A2) include ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, glycerin di(meth)acrylate, pentaerythritol di(meth)acrylate, 2,2-bis(4-(meth)acryloxydiethoxyphenyl)propane, 2,2-bis(4-(meth)acryloxypolyethoxyphenyl)propane, 2-hydroxy-3-(meth)acryloyloxypropyl (meth)acrylate, ethylene glycol diglycidyl ether di(meth)acrylate, diethylene glycol diglycidyl ether di(meth)acrylate, phthalic acid diglycidyl ester di(meth)acrylate, urethane (meth)acrylate (i.e. a reaction product of tolylene diisocyanate, trimethylhexamethylene diisocyanate, or hexamethylene diisocyanate, and 2-hydroxyethyl (meth)acrylate), methylene bis(meth)acrylamide, (meth)acrylamide methylene ether, and the like.

In terms of easily forming a cured product having a high refractive index, the acrylic monomer preferably includes compounds represented by the following formula (a4) as the bifunctional acrylic monomer (A2).

[Chem. 5]

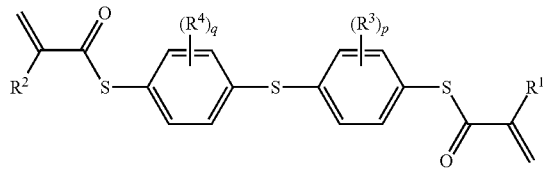

(a4)

In the formula (a4), $R^1$ and $R^2$ each independently is a hydrogen atom or a methyl group. $R^3$ and $R^4$ each independently is an alkyl group having 1 or more and 5 or less carbon atoms. p and q each independently is 0 or 1.

$R^1$ and $R^2$ each independently is a hydrogen atom or a methyl group. $R^1$ and $R^2$ may be the same as or different from each other. $R^1$ and $R^2$ are the same as each other because of the ease of synthesis or availability of the compound represented by the formula (a4).

$R^3$ and $R^4$ each independently is an alkyl group having 1 or more and 5 or less carbon atoms. $R^3$ and $R^4$ may be the same as or different from each other. $R^3$ and $R^4$ are the same as each other because of the ease of synthesis or availability of the compound represented by the formula (a4).

The alkyl group having 1 or more and 5 or less carbon atoms $R^3$ and $R^4$ may be linear or branched. Examples of the alkyl group having 1 or more and 5 or less carbon atoms $R^3$ and $R^4$ include a methyl group, an ethyl group, an n-propyl group, an isopropyl group, an n-butyl group, an isobutyl group, a sec-butyl group, a tert-butyl group, an n-pentyl group, an isopentyl group, and tert-pentyl group.

Specific examples of the compound represented by the formula (a4) include the following compounds.

particularly limited as long as the desired effect is not impaired. The percentage of the mass of the bifunctional acrylic monomer (A2) with respect to the mass of the photopolymerizable monomer (A) is preferably 0% by mass or more, more preferably 5% by mass or more, further preferably 10% by mass or more, and particularly preferably 15% by mass or more. The upper limit of the above percentage is preferably, for example, 50% by mass or less, more preferably 40% by mass or less, further preferably 30% by mass or less, and particularly preferably 25% by mass or less. When the photopolymerizable monomer (A) includes the compound represented by the formula (a4) as the bifunctional acrylic monomer (A2), the percentage of the mass of the compound represented by the formula (a4) with respect to the mass of the photopolymerizable monomer (A) is preferably 0% by mass or more, more preferably 5% by mass or more, further preferably 10% by mass or more, and particularly preferably 15% by mass or more. The upper limit of the above percentage is preferably, for example, 50% by mass or less, more preferably 40% by mass or less, further preferably 30% by mass or less, and particularly preferably 25% by mass or less.

Examples of the monofunctional acrylic monomer (A3) include (meth)acryl amide, methylol(meth)acrylamide, methoxymethyl(meth)acrylamide, ethoxymethyl(meth)acrylamide, propoxymethyl(meth)acrylamide, butoxymethoxymethyl(meth)acrylamide, N-methylol(meth)acrylamide, N-hydroxymethyl(meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamidesulfonic acid, methyl (meth)acrylate, ethyl (meth)acrylate, butyl (meth)acrylate, 2-ethylhexyl (meth)acrylate, cyclohexyl (meth)acrylate, 2-hydroxyethyl (meth)acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, glycerin mono(meth)acrylate, tetrahydrofurfuryl (meth)acrylate, dimethylamino (meth)acrylate, glycidyl (meth)acrylate, 2,2,2-trifluoroethyl (meth)acrylate, 2,2,3,3-tetrafluoropropyl (meth)acrylate, half (meth)acrylate of a phthalic acid derivative, and the like. These monofunctional

[Chem. 6]

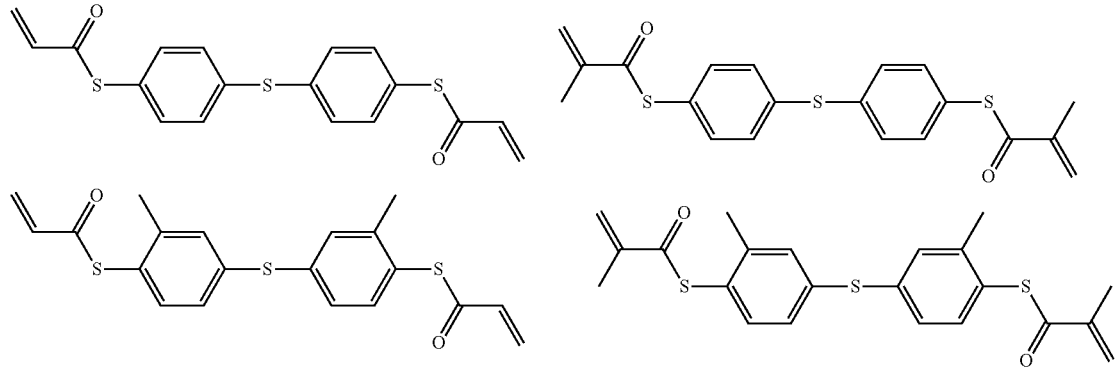

When the photopolymerizable monomer (A) includes a bifunctional acrylic monomer (A2), the percentage of the mass of bifunctional acrylic monomer (A2) with respect to the mass of the photopolymerizable monomer (A) is not acrylic monomers (A3) can be used alone or in combination of two or more kinds thereof.

In terms of easily forming the cured product having a high refractive index while the viscosity of the curable composition is reduced, the acrylic monomer preferably includes compounds represented by the following formula (a5) as the monofunctional acrylic monomer (A3).

[Chem.7]

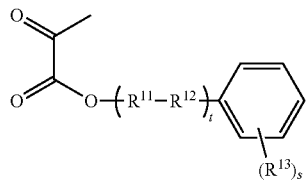

(a5)

In the formula (a5), $R^{10}$ is a hydrogen atom or a methyl group. $R^{11}$ is an alkylene group having 1 or more and 3 or less carbon atoms. $R^{12}$ is a single bond, an oxygen atom, or a sulfur atom. $R^{13}$ is an alkyl group having 1 or more and 4 or less carbon atoms, an alkoxy group having 1 or more and 4 or less carbon atoms, a phenoxy group, or a phenyl group. s is an integer of 0 or more and 5 or less. t is 0, 1 or 2.

In the formula (a5), when t is 2, a plurality of $R^{11}$ may be the same as or different from each other, and preferably the same as each other. When t is 2, a plurality of $R^{12}$ may be the same as or different from each other, and preferably the same as each other.

$R^{11}$ is an alkylene group having 1 or more and 3 or less carbon atoms. Specific examples of the alkylene group include a methylene group, an ethane-1,2-diyl group (an ethylene group), ethane-1,1-diyl group, a propane-1,3-diyl group, a propane-1,2-diyl group, and a propane-2,2-diyl group. Among them, a methylene group, an ethane-1,2-diyl group (an ethylene group), a propane-1,3-diyl group, and a propane-1,2-diyl group are preferable, and an ethane-1,2-diyl group (an ethylene group) is more preferable.

$R^{12}$ is preferably a single bond, an oxygen atom, or a sulfur atom, and is preferably a single bond. When $R^{12}$ is a single bond, t is preferably 1.

$R^{13}$ is an alkyl group having 1 or more and 4 or less carbon atoms, an alkoxy group having 1 or more and 4 or less carbon atoms, a phenoxy group, or a phenyl group. In terms of reducing viscosity, an alkyl group or an alkoxy group having 1 or more and 4 or less carbon atoms are preferable. Specific examples of the alkyl group include a methyl group, an ethyl group, an n-propyl group, an isopropyl group, an n-butyl group, an isobutyl group, a sec-butyl group, and a tert-butyl group. Among them, a methyl group, and an ethyl group are preferable, and a methyl group is more preferable. Specific examples of the alkoxy group include a methoxy group, an ethoxy group, an n-propyloxy group, an isopropyloxy group, an n-butyloxy group, an isobutyloxy group, a sec-butyloxy group, and a tert-butyloxy group. Among them, a methoxy group, and an ethoxy group are preferable, and a methoxy group is more preferable. s is an integer of 0 or more and 5 or less, 0 or 1 is preferable, and 0 is more preferable.

Specific examples of the compound represented by the formula (a5) include the following compounds.

[Chem. 8]

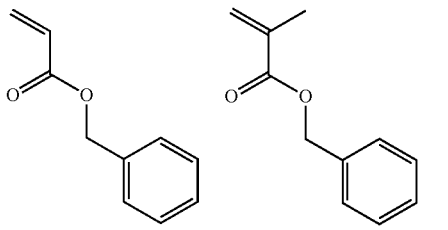

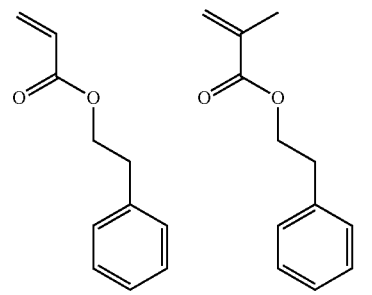

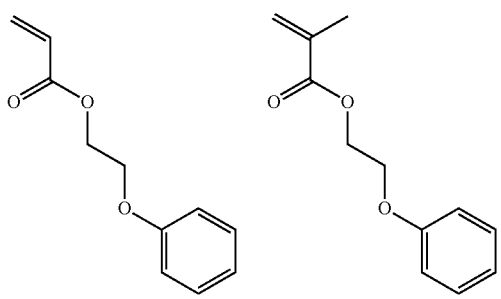

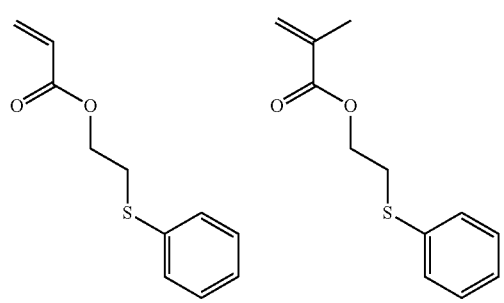

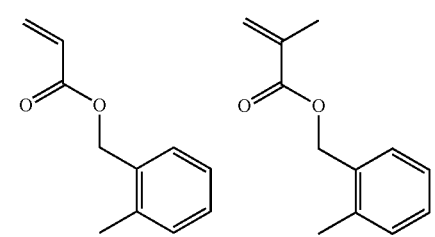

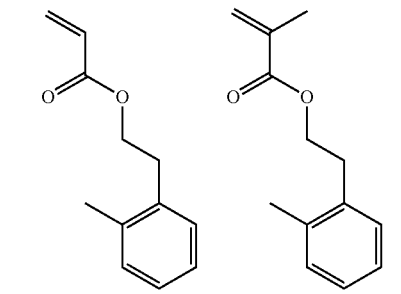

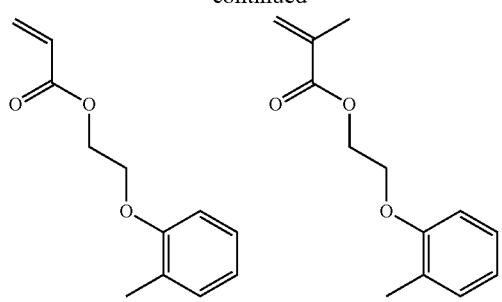
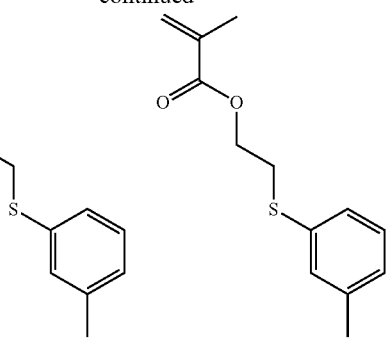
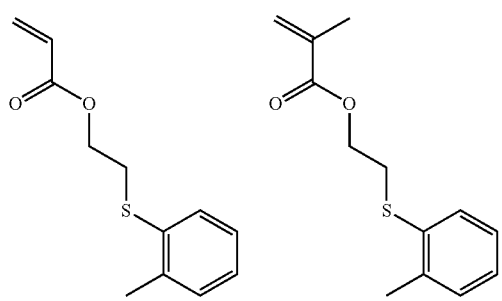
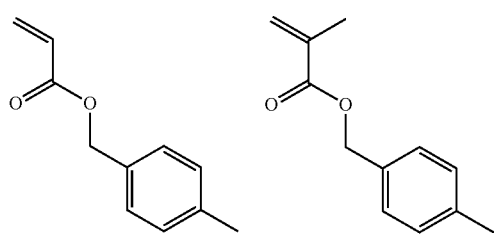
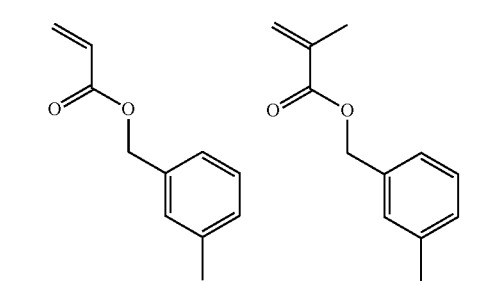
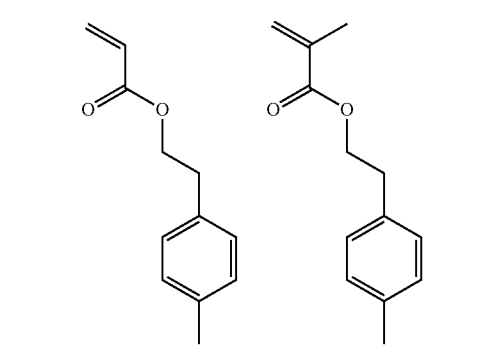
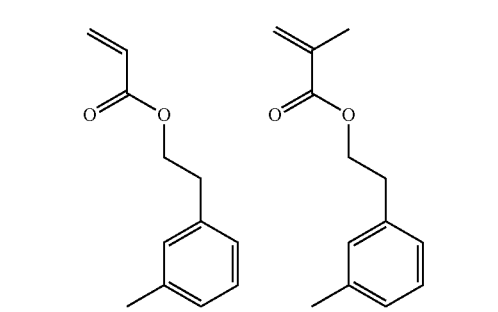
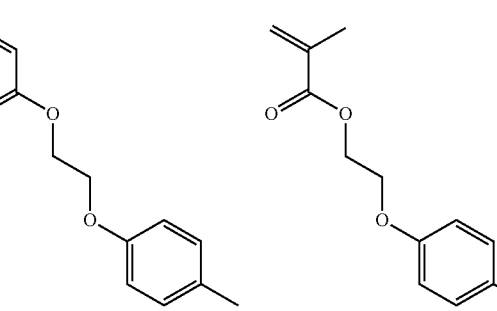
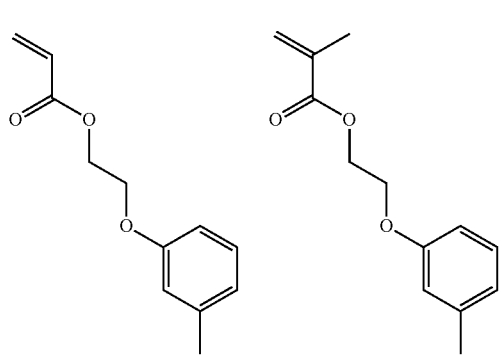
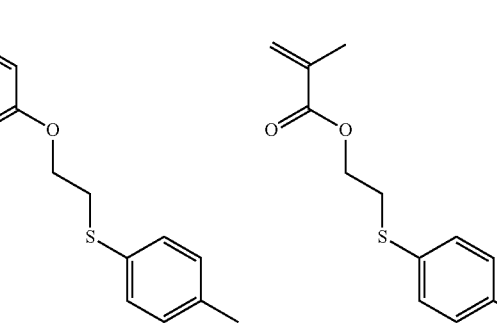

-continued
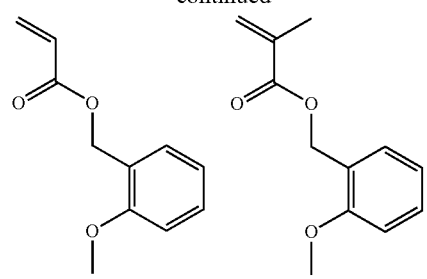
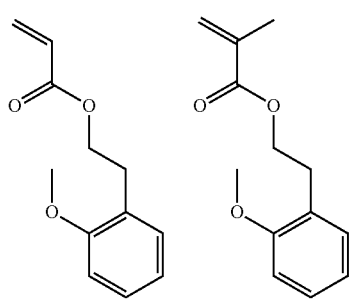
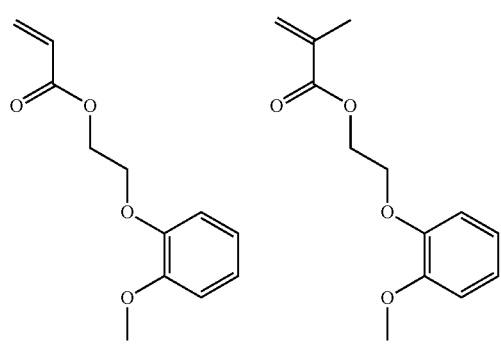
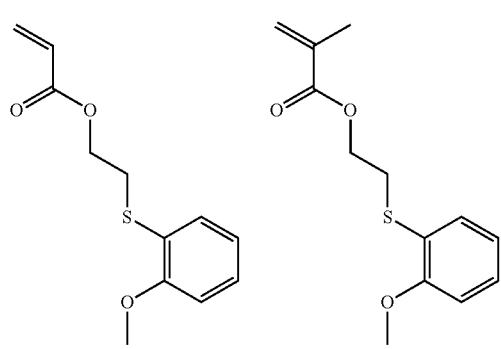
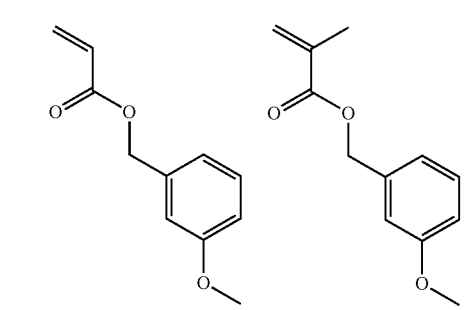
-continued
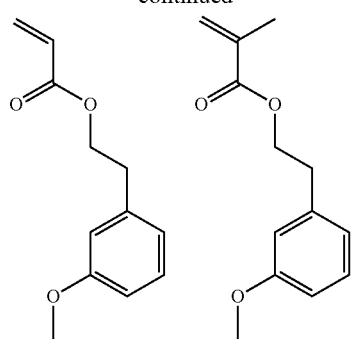
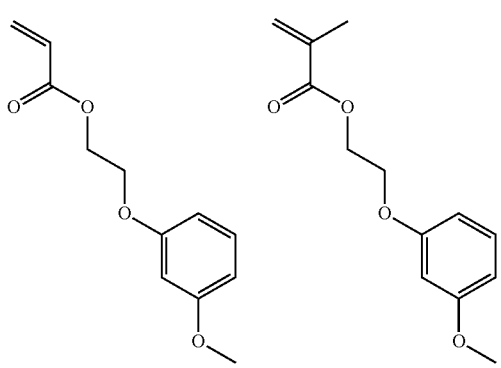
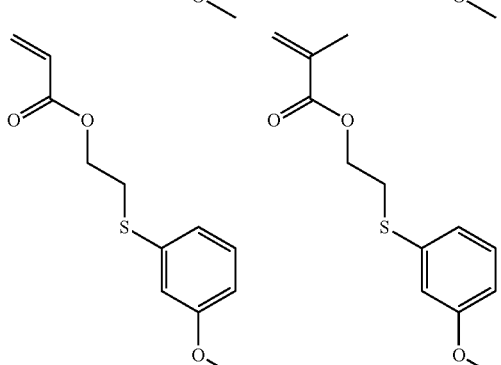
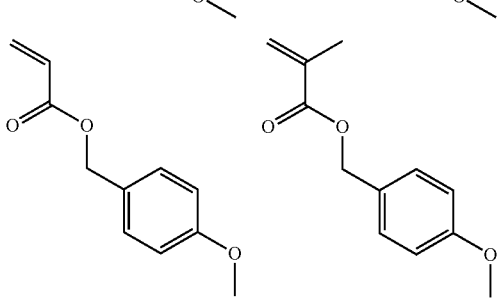
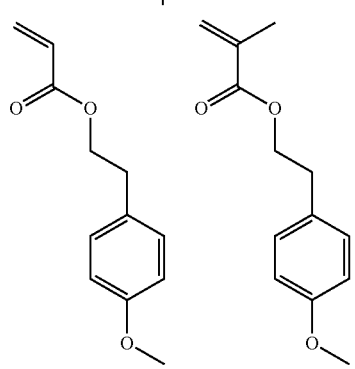

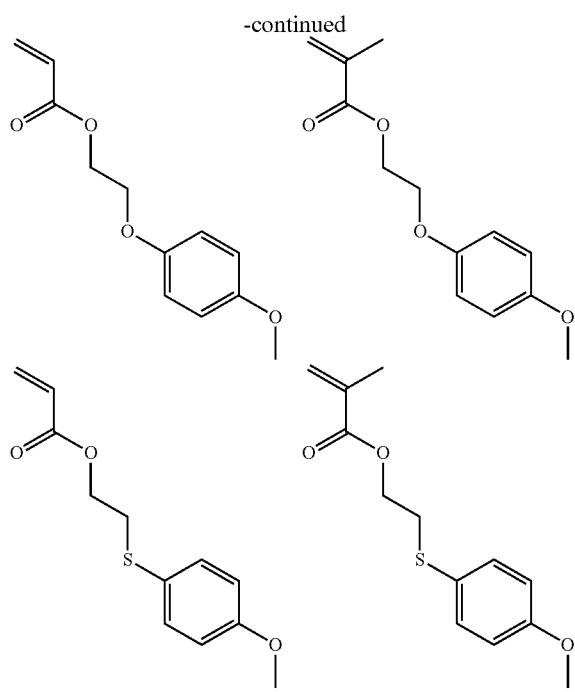

When the photopolymerizable monomer (A) includes a monofunctional acrylic monomer (A3), the percentage of the mass of monofunctional acrylic monomer (A3) with respect to the mass of the photopolymerizable monomer (A) is not particularly limited as long as the desired effect is not impaired. The percentage of the mass of the monofunctional acrylic monomer (A3) with respect to the mass of the photopolymerizable monomer (A) is preferably 0% by mass or more, more preferably 5% by mass or more, further preferably 10% by mass or more, and particularly preferably 15% by mass or more. The upper limit of the above percentage is preferably, for example, 50% by mass or less, more preferably 40% by mass or less, further preferably 30% by mass or less, and particularly preferably 25% by mass or less.

The percentage of the photopolymerizable monomer (A) with respect to the mass of the curable composition after excluding the mass of the solvent (S) is preferably 20% by mass or more and 90% by mass or less, more preferably 40% by mass or more and 75% by mass or less, and further preferably 45% by mass or more and 70% by mass or less.

[Metal Oxide Nanoparticles (B)]

A curable composition includes metal oxide nanoparticles (B). Types of metal oxide constituting the metal oxide nanoparticles are not particularly limited as long as the desired effect is not impaired. Preferable examples of the metal oxide nanoparticles (B) include at least one selected from the group consisting of zirconium oxide nanoparticles, titanium dioxide nanoparticles, barium titanate nanoparticles, and cerium oxide nanoparticles. The curable composition may include one of these metal oxide nanoparticles (B) singly, or two or more of them in combination. When the curable composition includes the above metal oxide nanoparticles (B), a cured product showing a high refractive index can be formed.

An average particle diameter of the metal oxide nanoparticles (B) is preferably 500 nm or less, and more preferably 2 nm or more and 100 nm or less in terms of transparency of the cured product.

The surface of the metal oxide nanoparticles (B) may not be modified, or may be modified with an ethylenically unsaturated double bond-containing group. When the surface of the metal oxide nanoparticles (B) is modified with an ethylenically unsaturated double bond-containing group, the photopolymerizable monomer (A) is polymerized together with the metal oxide nanoparticles (B), and the metal oxide nanoparticles (B) are easily fixed in a matrix made of polymers of the photopolymerizable monomer when a cured product is formed (A). Thus, since aggregation of the metal oxide nanoparticles (B) does not easily occur, when the surface of the metal oxide nanoparticles (B) is modified with an ethylenically unsaturated double bond-containing group, localization of the metal oxide nanoparticles (B) in the cured product is particularly easily suppressed.

For example, a capping agent containing an ethylenically unsaturated double bond acts on the surface of the metal oxide nanoparticle (B) to obtain the metal oxide nanoparticle (B) having a surface modified with an ethylenically unsaturated double bond-containing group through a chemical bond such as a covalent bond.

A method for bonding the capping agent including an ethylenically unsaturated double bond with the metal oxide nanoparticles (B) through a chemical bond such as a covalent bond is not particularly limited. On the surface of the metal oxide nanoparticles (B), a hydroxyl group is usually present. By reacting the hydroxyl group with a reactive group of the capping agent, the capping agent is covalently bonded to the surface of the metal oxide nanoparticles (B). Preferable examples of the reactive group possessed by the capping agent include a trialkoxysilyl group such as a trimethoxysilyl group or a triethoxysilyl group; a dialkoxysilyl group such as a dimethoxysilyl group or a diethoxysilyl group; a monoalkoxysilyl group such as a monomethoxysilyl group or a monoethoxysilyl group; a trihalosilyl group such as a trichlorosilyl group; a dihalosilyl group such as a dichlorosilyl group; a monohalosilyl group such as a monochlorosilyl group; a carboxy group; a halocarbonyl group such as a chlorocarbonyl group; a hydroxyl group; a phosphono group (—P(=O)(OH)$_2$); and a phosphate group (—O—P(=O) (OH)$_2$).

A trialkoxysilyl group, a dialkoxysilyl group, a monoalkoxysilyl group, a trihalosilyl group, a dihalosilyl group, and a monohalosilyl group form a siloxane bond together with a surface of a metal oxide nanoparticles (B). A carboxy group and a halocarbonyl group forms a bond represented by (metal oxide-O—CO—) together with a surface of a metal oxide nanoparticles (B). A hydroxyl group forms a bond represented by (metal oxide —O—) together with a surface of a metal oxide nanoparticles (B). A phosphono group and a phosphate group forms a bond represented by metal oxide-O—P(=O)<) together with a surface of a metal oxide nanoparticles (B).

In the capping agent, examples of the group to be bonded to the reactive group include a hydrogen atom and various organic groups. The organic group may contain heteroatoms such as O, N, S, P, B, Si, and a halogen atom. Examples of the group to be bonded to the reactive group include an alkyl group which may be linear or branched and may be interrupted with an oxygen atom (—O—), an alkenyl group which may be linear or branched and may be interrupted with an oxygen atom (—O—), an alkynyl group which may be linear or branched and may be interrupted with an oxygen atom (—O—), a cycloalkyl group, an aromatic hydrocarbon group, and a heterocyclic group. These groups may be substituted with substituents, for example, a halogen atom, an epoxy group-containing group such as a glycidyl group, a hydroxyl group, a mercapto group, an amino group, a (meth)acryloyl group, and an isocyanate group. The number of substituents is not particularly limited.

The group to be bonded to the reactive group is also preferably a group represented by —(SiR$^{b1}$R$^{b2}$—O—)$_r$—(SiR$^{b3}$R$^{b4}$—O—)$_a$—R$^{b5}$. R$^{b1}$, R$^{b2}$, R$^{b3}$, and R$^{b4}$ each are an organic group which may be the same or different. Suitable examples of the organic group include an alkyl group such as a methyl group or an ethyl group; an alkenyl group such as a vinyl group or an allyl group; an aromatic hydrocarbon group such as a phenyl group, a naphthyl group, or a tolyl group; an epoxy group-containing group such as a 3-glycidoxypropyl group; a (meth)acryloyloxy group, and the like. Examples of R$^{b5}$ in the above formula include terminal groups such as —Si(CH$_3$)$_3$, —Si (CH$_3$)$_2$H, —Si(CH$_3$)$_2$(CH=CH$_2$), and —Si(CH$_3$)$_2$(CH$_2$CH$_2$CH$_2$CH$_3$). In the above formula, r and s each independently is an integer of 0 or more and 60 or less. Both r and s in the above formula are not 0.

Specific suitable examples of the capping agent include unsaturated group-containing alkoxysilane such as vinyltrimethoxirane, vinyltriethoxysilane, allyltrimethoxysilane, allyltriethoxysilane, 1-hexenyltrimethoxysilane, 1-hexenyltriethoxysilane, 1 octenyltrimethoxysilane, 1-octenyltriethoxysilane, 3-acryloyloxypropyltrimethoxysilane, 3-acryloylpropyltriethoxysilane, 3-methacryloyloxypropyltrimethoxysilane, and 3-methacryloyloxypropyltriethoxysilane; unsaturated group-containing alcohols such as 2-hydroxyethyl(meth)acrylate, 3-hydroxypropyl(meth)acrylate, allyl alcohol, ethylene glycol monoallyl ether, propylene glycol monoallyl ether, and 3-allyloxy propanol; (meth)acrylic acid; (meth)acrylic acid halides such as (meth)acrylic acid chloride, and the like.

When the capping agent is bonded through a chemical bond such as a covalent bond to the surface of the metal oxide nanoparticles (B), the amount of the capping agent used is not particularly limited. Preferably, the capping agent is used in the amount enough to react with almost all of hydroxyl groups of the surface of the metal oxide nanoparticles (B).

The content of the metal oxide nanoparticles (B) in the curable composition is not particularly limited as long as the object of the present invention is not inhibited. The content of the metal oxide nanoparticles (B) in the curable composition is preferably 5% by mass or more and 70% by mass or less, more preferably 20% by mass or more and 55% by mass or less, and further preferably 25% by mass or more and 50% by mass or less with respect to the mass of the curable composition excluding the mass of the solvent (S). When the content of the metal oxide nanoparticles (B) in the curable composition is in the above range, a cured product suppressing localization of the metal oxide nanoparticles (B) in the cured product and having a high refractive index is formed. Note here that when the surface of the metal oxide nanoparticles (B) is modified with an ethylenically unsaturated double bond-containing group, the mass of the capping agent having an ethylenically unsaturated double bond-containing group being present on the surface of the metal oxide nanoparticles (B) is included in the mass of the metal oxide nanoparticles (B).

[Photopolymerization Initiating Agent (C)]

The photopolymerization initiating agent (C) is not particularly limited, and conventionally known photopolymerization initiating agents can be used.

Specific examples of the photopolymerization initiating agent (C) include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenylethan-1-one, bis(4-dimethylaminophenyl)ketone, 2-methyl-1-[4-(methylthio)phenyl]-2-morpholinopropan-1-one, 2-benzyl-2-dimethylamino-1-(4-morpholinophenyl)-butan-1-one, 0-acetyl-1-[6-(2-methylbenzoyl)-9-ethyl-9H-carbazole-3-yl]ethanone oxime, (9-ethyl-6-nitro-9H-carbazole-3-yl)[4-(2-methoxy-1-methylethoxy)-2-methylphenyl]methanone 0-acetyl oxime, 2-(benzoyloxyimino)-1-[4-(phenylthio)phenyl]-1-octanone, 2,4,6-trimethylbenzoyldiphenylphosphine oxide, 4 benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-μ-methoxyethyl acetal, benzyl dimethyl ketal, 1-phenyl-1,2-propanedione-2-(0-ethoxycarbonyl)oxime, methyl o-benzoylbenzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethylanthraquinone, 1,2-benzanthraquinone, 2,3-diphenylanthraquinone, azobisisobutyronitrile, benzoyl peroxide, cumene hydroperoxide, 2-mercaptobenzimidazole, 2-mercaptobenzoxazole, 2-mercaptobenzothiazole, 2-(o-chlorophenyl)-4,5-di(m-methoxyphenyl)-imidazolyl dimer, benzophenone, 2-chlorobenzophenone, p,p'-bisdimethylaminobenzophenone, 4,4'-bisdiethylaminobenzophenone, 4,4'-dichlorobenzophenone, 3,3-dimethyl-4-methoxybenzophenone, benzyl, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, α,α-dichloro-4-phenoxyacetophenone, thioxanthone, 2-methylthioxanthone, 2-isopropylthioxanthone, dibenzosuberone, pentyl-4-dimethylaminobenzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris(trichloromethyl)-s-triazine, 2-methyl-4,6-bis(trichloromethyl)-s-triazine, 2-[2-(5-methylfuran-2-yl) ethenyl]-4,6-bis(trichloromethyl)-s-triazine, 2-[2-(furan-2-yl) ethenyl]-4,6-bis(trichloromethyl)-s-triazine, 2-[2-(4-diethylamino-2-methylphenyl)ethenyl]-4,6-bis (trichloromethyl)-s-triazine, 2-[2-(3,4-dimethoxyphenyl) ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy) styrylphenyl-s-triazine, 2,4-bis-trichloromethyl-6-(2-bromo-4-methoxy)styrylphenyl-s-triazine, and the like. These photopolymerization initiating agents (C) can be used alone or in combination of two or more types thereof.

Among the photopolymerization initiating agents (C), in terms of sensitivity of the curable composition, an oxime ester compound is preferable. As the oxime ester compound, a compound having a partial structure represented by the following formula (c1) is preferable.

[Chem. 9]

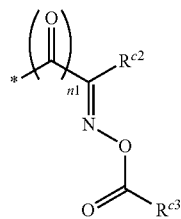

(c1)

(In the formula (c1), n1 is 0 or 1, $R^{c2}$ is a monovalent organic group, $R^{c3}$ is a hydrogen atom, an aliphatic hydrocarbon group having 1 or more and 20 or less carbon atoms which may have a substituent, or an aryl group which may have a substituent, and "*" denotes a bond)

The compound having a partial structure represented by the formula (c1) preferably has a carbazole skeleton, a fluorene skeleton, a diphenyl ether skeleton, or a phenyl sulfide skeleton. The compound having a partial structure represented by the formula (c1) preferably has one or two partial structures represented by the formula (c1).

Examples of the compound having a partial structure represented by the formula (c1) include the compounds represented by the following formula (c2).

[Chem. 10]

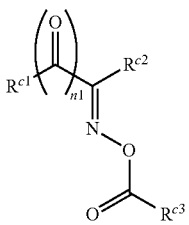

(c2)

(In the formula (c2), $R^{c1}$ is a group represented by the following formula (c3), (c4), or (c5), n1 is 0 or 1, $R^{c2}$ is a monovalent organic group, and $R^{c3}$ is a hydrogen atom, an aliphatic hydrocarbon group having 1 or more and 20 or less carbon atoms which may have a substituent, or an aryl group which may have a substituent)

[Chem. 11]

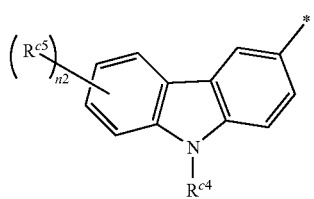

(c3)

(In the formula (c3), $R^{c4}$ and $R^{c5}$ each independently is a monovalent organic group, n2 is an integer of 0 or more and 3 or less, when n2 is 2 or 3, a plurality of $R^{c5}$ may be the same as or different from each other, and the plurality of $R^{c5}$ may be bonded to each other to form a ring, and "*" denotes a bond)

[Chem. 12]

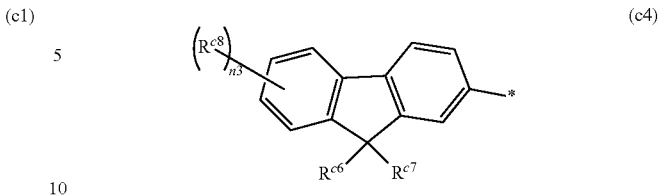

(c4)

(In the formula (c4), $R^{c6}$ and $R^{c7}$ each independently is a chain alkyl group which may have a substituent, a chain alkoxy group which may have a substituent, an organic group which may have a substituent, or a hydrogen atom, $R^{c6}$ and $R^{c7}$ may be bonded to each other to form a ring, $R^{c7}$ and a benzene ring in the fluorene skeleton may be bonded to each other to form a ring, $R^{c8}$ is a nitro group or a monovalent organic group, n3 is an integer of 0 or more and 4 or less, and "*" denotes a bond)

[Chem. 13]

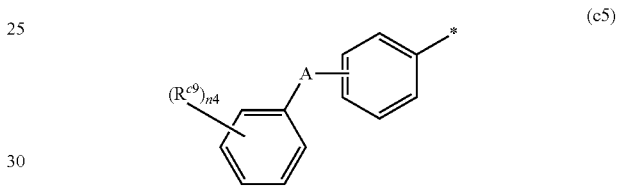

(c5)

(In the formula (c5), $R^{c9}$ is a monovalent organic group, a halogen atom, a nitro group, or a cyano group, A is S or O, n4 is an integer of 0 or more and 4 or less, and "*" denotes a bond)

(In the formula (c3), $R^{c4}$ is a monovalent organic group. $R^{c4}$ can be selected from various organic groups as long as the object of the present invention is not inhibited. As the organic group, a carbon atom-containing group is preferable, one or more carbon atoms, and a group including one or more atoms selected from the group consisting of H, O, S, Se, N, B, P, Si, and a halogen atom is more preferable. The number of carbon atoms of the carbon atom-containing group is not particularly limited, but the number is preferably 1 or more and 50 or less, and more preferably 1 or more and 20 or less. Suitable examples of $R^{c4}$ include an alkyl group having 1 or more and 20 or less carbon atoms which may have a substituent, a cycloalkyl group having 3 or more and 20 or less carbon atoms which may have a substituent, a saturated aliphatic acyl group having 2 or more and 20 or less carbon atoms which may have a substituent, an alkoxy carbonyl group having 2 or more and 20 or less carbon atoms which may have a substituent, a phenyl group which may have a substituent, a benzoyl group which may have a substituent, a phenoxy carbonyl group which may have a substituent, a phenyl alkyl group having 7 or more and 20 or less carbon atoms which may have a substituent, a naphthyl group which may have a substituent, a naphthoyl group which may have a substituent, a naphthoxy carbonyl group which may have a substituent, a naphthylalkyl group having 11 or more and 20 or less carbon atoms which may have a substituent, a heterocyclyl group which may have a substituent, a heterocyclyl carbonyl group which may have a substituent, and the like.

Among $R^{c4}$, an alkyl group having 1 or more and 20 or less carbon atoms is preferable. The alkyl group may be linear or branched. In terms of good solubility of the compound represented by the formula (c3) in the curable composition, the number of carbon atoms of the alkyl group as $R^{c4}$ is preferably 2 or more, more preferably 5 or more, and particularly preferably 7 or more. Furthermore, in terms of good compatibility of the compound represented by the formula (c3) with other components in the curable composition, the number of carbon atoms of an alkyl group as $R^{c4}$ is preferably 15 or less, and more preferably 10 or less.

When $R^{c4}$ has a substituent, suitable examples of the substituent include a hydroxyl group, an alkyl group having 1 or more and 20 or less carbon atoms, an alkoxy group having 1 or more and 20 or less carbon atoms, an aliphatic acyl group having 2 or more and 20 or less carbon atoms, an aliphatic acyloxy group having 2 or more and 20 or less carbon atoms, a phenoxy group, a benzoyl group, a benzoyloxy group, a group represented by —PO(OR)$_2$ (R is an alkyl group having 1 or more and 6 or less carbon atoms), a halogen atom, a cyano group, a heterocyclyl group, and the like.

When $R^{c4}$ is a heterocyclyl group, the heterocyclyl group may be an aliphatic heterocyclic group or an aromatic heterocyclic group. When $R^{c4}$ is a heterocyclyl group, the heterocyclyl group is a 5- or 6-membered single ring including one or more N, S, and O, or a heterocyclyl group in which single rings are fused to each other, or a single ring is fused with a benzene ring. When the heterocyclyl group is a fused ring, the number of rings is 3 or less. Examples of the heterocycle constituting the heterocyclyl group include furan, thiophene, pyrrole, oxazole, isoxazole, triazole, thiadiazole, isothiazole, imidazole, pyrazole, triazole, pyridine, pyrazine, pyrimidine, pyridazine, benzofuran, benzothiophene, indole, isoindole, indolizine, benzoimidazole, benzotriazole, benzoxazole, benzothiazole, carbazole, purine, quinoline, isoquinoline, quinazoline, phthalazine, cinnoline, quinoxaline, piperidine, piperazine, morpholine, piperidine, tetrahydropyran, and tetrahydrofuran. When $R^{c4}$ is a heterocyclyl group, examples of the substituent which the heterocyclyl group may have include a hydroxyl group, an alkoxy group having 1 or more and 6 or less carbon atoms, a halogen atom, a cyano group, a nitro group, and the like.

Suitable specific examples of the above-described $R^{c4}$ include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a pentane-3-yl group, a sec-pentyl group, a tert-pentyl group, an n-hexyl group, an n-heptyl group, an n-octyl group, and a 2-ethyl hexyl group. Furthermore, in terms of good solubility of the compound represented by the formula (c3) in the curable composition, an n-octyl group and a 2-ethyl hexyl group are preferable, and a 2-ethyl hexyl group is more preferable.

In the formula (c3), $R^{c5}$ is a monovalent organic group. $R^{c5}$ can be selected from various organic groups as long as the object of the present invention is not inhibited. As the organic group, a carbon atom-containing group is preferable; one or more carbon atoms, and a group including one or more atoms selected from the group consisting of H, O, S, Se, N, B, P, Si, and a halogen atom is more preferable. The number of carbon atoms of the carbon atom-containing group is not particularly limited, but the number is preferably 1 or more and 50 or less, and more preferably 1 or more and 20 or less. Suitable examples of the monovalent organic group as $R^{c5}$ include an alkyl group, an alkoxy group, a cycloalkyl group, a cycloalkoxy group, a saturated aliphatic acyl group, an alkoxycarbonyl group, a saturated aliphatic acyloxy group, a phenyl group which may have a substituent, a phenoxy group which may have a substituent, a benzoyl group which may have a substituent, a phenoxycarbonyl group which may have a substituent, a benzoyloxy group which may have a substituent, a phenyl alkyl group which may have a substituent, a naphthyl group which may have a substituent, a naphthoxy group which may have a substituent, a naphthoyl group which may have a substituent, a naphthoxycarbonyl group which may have a substituent, a naphthoyloxy group which may have a substituent, a naphthylalkyl group which may have a substituent, a heterocyclyl group which may have a substituent, a heterocyclylcarbonyl group which may have a substituent, an amino group substituted with one or two organic groups, a morpholin-1-yl group, a piperazin-1-yl group, halogen, a nitro group, a cyano group, a substituent including a group represented by HX$_2$C— or H$_2$XC— (wherein X each independently is a halogen atom), and the like.

When $R^{c5}$ is an alkyl group, the number of carbon atoms of the alkyl group is preferably 1 or more and 20 or less, and more preferably 1 or more and 6 or less. When $R^{c5}$ is an alkyl group, the alkyl group may be linear or branched. When $R^{c5}$ is an alkyl group, specific examples include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. When $R^{c5}$ is an alkyl group, the alkyl group may contain an ether bond (—O—) in the carbon chain. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, a methoxypropyl group, and the like.

When $R^{c5}$ is an alkoxy group, the number of carbon atoms of the alkoxy group is preferably 1 or more and 20 or less, and more preferably 1 or more and 6 or less. When $R^{c5}$ is an alkoxy group, the alkyl group may be linear or branched. When $R^1$ is an alkoxy group, specific examples include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, and an isodecyloxy group. When $R^{c5}$ is an alkoxy group, the alkoxy group may include an ether bond (—O—) in the carbon chain. Examples of the alkoxy group having an ether bond in the carbon chain include a methoxyethoxy group, an ethoxyethoxy group, a methoxyethoxyethoxy group, an ethoxyethoxyethoxy group, a propyloxyethoxyethoxy group, a methoxypropyloxy group, and the like.

When $R^{c5}$ is a cycloalkyl group or a cycloalkoxy group, the number of carbon atoms of the cycloalkyl group or cycloalkoxy group is preferably 3 or more and 10 or less, and more preferably 3 or more and 6 or less. When $R^{c5}$ is a cycloalkyl group, specific examples include a cyclopropyl group, a cyclobutyl group, a cyclopentyl group, a cyclohexyl group, a cycloheptyl group, a cyclooctyl group, and the like.

When $R^{c5}$ is a cycloalkoxy group, specific examples include a cyclopropyloxy group, a cyclobutyloxy group, a cyclopentyloxy group, a cyclohexyloxy group, a cycloheptyloxy group, a cyclooctyloxy group, and the like.

When $R^{c5}$ is a saturated aliphatic acyl group or a saturated aliphatic acyloxy group, the number of carbon atoms of the saturated aliphatic acyl group or saturated aliphatic acyloxy group is preferably 2 or more and 21 or less, and more preferably 2 or more and 7 or less. When $R^{c5}$ is a saturated aliphatic acyl group, specific examples include an acetyl group, a propanoyl group, an n-butanoyl group, a 2-methylpropanoyl group, an n-pentanoyl group, a 2,2-dimethylpropanoyl group, an n-hexanoyl group, an n-heptanoyl group, an n-octanoyl group, an n-nonanoyl group, an n-decanoyl group, an n-undecanoyl group, an n-dodecanoyl group, an n-tridecanoyl group, an n-tetradecanoyl group, an n-pentadecanoyl group, an n-hexadecanoyl group, and the like. When $R^{c5}$ is a saturated aliphatic acyloxy group, specific examples include an acetyloxy group, a propanoyloxy group, an n-butanoyloxy group, a 2-methylpropanoyloxy group, an n-pentanoyloxy group, a 2,2-dimethylpropanoyloxy group, an n-hexanoyloxy group, an n-heptanoyloxy group, an n-octanoyloxy group, an n-nonanoyloxy group, an n-decanoyloxy group, an n-undecanoyloxy group, an n-dodecanoyloxy group, an n-tridecanoyloxy group, an n-tetradecanoyloxy group, an n-pentadecanoyloxy group, an n-hexadecanoyloxy group, and the like.

When $R^{c5}$ is an alkoxycarbonyl group, the number of carbon atoms of the alkoxycarbonyl group is preferably 2 or more and 20 or less, and more preferably 2 or more and 7 or less. When $R^{c5}$ is an alkoxycarbonyl group, specific examples include a methoxycarbonyl group, an ethoxycarbonyl group, an n-propyloxycarbonyl group, an isopropyloxycarbonyl group, an n-butyloxycarbonyl group, an isobutyloxycarbonyl group, a sec-butyloxycarbonyl group, a tert-butyloxycarbonyl group, an n-pentyloxycarbonyl group, an isopentyloxycarbonyl group, a sec-pentyloxycarbonyl group, a tert-pentyloxycarbonyl group, an n-hexyloxycarbonyl group, an n-heptyloxycarbonyl group, an n-octyloxycarbonyl group, an isooctyloxycarbonyl group, a sec-octyloxycarbonyl group, a tert-octyloxycarbonyl group, an n-nonyloxycarbonyl group, an isononyloxycarbonyl group, an n-decyloxycarbonyl group, an isodecyloxycarbonyl group, and the like.

When $R^{c5}$ is a phenyl alkyl group, the number of carbon atoms of the phenyl alkyl group is preferably 7 or more and 20 or less, and more preferably 7 or more and 10 or less. When $R^{c5}$ is a naphthylalkyl group, the number of carbon atoms of the naphthylalkyl group is preferably 11 or more and 20 or less, and more preferably 11 or more and 14 or less. When $R^{c5}$ is a phenyl alkyl group, specific examples include a benzyl group, a 2-phenylethyl group, a 3-phenylpropyl group, and a 4-phenylbutyl group. When $R^{c5}$ is a naphthylalkyl group, specific examples include an α-naphthylmethyl group, a β-naphthylmethyl group, a 2-(α-naphthyl)ethyl group, and a 2-(β-naphthyl)ethyl group. When $R^{c5}$ is a phenyl alkyl group or a naphthylalkyl group, $R^{c5}$ may further have a substituent on a phenyl group or a naphthyl group.

When $R^{c5}$ is a heterocyclyl group, the heterocyclyl group is the same as that in a case where $R^{c4}$ in the formula (c3) is a heterocyclyl group, and the heterocyclyl group may further include a substituent. When $R^{c5}$ is a heterocyclylcarbonyl group, the heterocyclyl group included in the heterocyclylcarbonyl group is the same as that in a case where $R^{c5}$ is a heterocyclyl group.

When $R^{c5}$ is an amino group substituted with one or two organic groups, suitable examples of the organic group include an alkyl group having 1 or more and 20 or less carbon atoms, a cycloalkyl group having 3 or more and 10 or less carbon atoms, a saturated aliphatic acyl group having 2 or more and 21 or less carbon atoms, a phenyl group which may have a substituent, a benzoyl group which may have a substituent, a phenyl alkyl group having 7 or more and 20 or less carbon atoms which may have a substituent, a naphthyl group which may have a substituent, a naphthoyl group which may have a substituent, a naphthylalkyl group having 11 or more and 20 or less carbon atoms which may have a substituent, a heterocyclyl group, and the like. Specific examples of suitable organic groups are the same as those in $R^{c5}$. Specific examples of the amino group substituted with one or two organic group include a methylamino group, an ethylamino group, a diethylamino group, an n-propylamino group, a di-n-propylamino group, an isopropylamino group, an n-butylamino group, a di-n-butylamino group, an n-pentylamino group, an n-hexylamino group, an n-heptylamino group, an n-octylamino group, an n-nonylamino group, an n-decylamino group, a phenylamino group, a naphthylamino group, an acetylamino group, an propanoylamino group, an n-butanoylamino group, an n-pentanoylamino group, an n-hexanoylamino group, an n-heptanoylamino group, an n-octanoylamino group, an n-decanoylamino group, a benzoylamino group, an α-naphthoylamino group, a β-naphthoylamino group, and the like.

When a phenyl group, a naphthyl group, and a heterocyclyl group included in $R^{c5}$ further have a substituent, examples of the substituent include a substituent including a group represented by $HX_2C-$ or $H_2XC-$ (for example, a halogenated alkoxy group represented by $HX_2C-$ or $H_2XC-$, and a halogenated alkyl group represented by $HX_2C-$ or $H_2XC-$), an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group including an alkyl group having 1 or more and 6 or less carbon atoms, a dialkylamino group including an alkyl group having 1 or more and 6 or less carbon atoms, a morpholin-1-yl group, an piperazin-1-yl group, a benzoyl group, halogen, a nitro group, a cyano group, and the like. When a phenyl group, a naphthyl group, and a heterocyclyl group included in $R^{c5}$ further have a substituent, the number of substituents is not particularly limited as long as the object of the present invention is not inhibited, and is preferably 1 or more and 4 or less. When a phenyl group, a naphthyl group, and a heterocyclyl group included in $R^{c5}$ have a plurality of substituents, the plurality of substituents may be the same as or different from each other.

When a benzoyl group included in $R^5$ further includes a substituent, examples of the substituent include an alkyl group having 1 or more and 6 or less carbon atoms, a morpholin-1-yl group, a piperazin-1-yl group, a 2-thenoyl group (thiophene-2-ylcarbonyl group), a furan-3-ylcarbonyl group, a phenyl group, and the like.

Examples of the halogen atom represented by X include a fluorine atom, a chlorine atom, a bromine atom, and the like, and a fluorine atom is preferable.

Examples of the substituent including a group represented by $HX_2C-$ or $H_2XC-$ include a halogenated alkoxy group including a group represented by $HX_2C-$ or $H_2XC-$, a group having a halogenated alkoxy group including a group represented by $HX_2C-$ or $H_2XC-$, a halogenated alkyl group including a group represented by $HX_2C-$ or $H_2XC-$, a group having a halogenated alkyl group including a group represented by $HX_2C-$ or $H_2XC-$, and the like, and a halogenated alkoxy group including a group represented by $HX_2C-$ or $H_2XC-$, or a halogenated alkoxy group including a group represented by $HX_2C-$ or $H_2XC-$ are more preferable.

Examples of the group having a halogenated alkyl group including a group represented by $HX_2C-$ or $H_2XC-$ include an aromatic group (for example, a phenyl group and a naphthyl group) substituted by a halogenated alkyl group including a group represented by $HX_2C-$ or $H_2XC-$, a cycloalkyl group (for example, a cyclopentyl group and a cyclohexyl group) substituted by a halogenated alkyl group including a group represented by $HX_2C-$ or $H_2XC-$, and the like, and an aromatic group substituted by a halogenated alkyl group including a group represented by $HX_2C-$ or $H_2XC-$ is preferable.

Examples of the group having a halogenated alkoxy group including a group represented by $HX_2C-$ or $H_2XC-$ include an aromatic group (for example, a phenyl group and a naphthyl group) substituted by a halogenated alkoxy group including a group represented by $HX_2C-$ or $H_2XC-$, an alkyl group (for example, a methyl group, an ethyl group, an n-propyl group, and an i-propyl group) substituted by a halogenated alkoxy group including a group represented by $HX_2C-$ or $H_2XC-$, a cycloalkyl group (for example, a cyclopentyl group and a cyclohexyl group) substituted by a halogenated alkoxy group including a group represented by $HX_2C-$ or $H_2XC-$, and the like, and an aromatic group substituted by a halogenated alkoxy group including a group represented by $HX_2C-$ or $H_2XC-$ is preferable.

$R^{c5}$ is preferably a cycloalkylalkyl group, a phenoxyalkyl group which may have a substituent on an aromatic ring, and a phenylthioalkyl group which may have a substituent on an aromatic ring. The substituent which may be possessed by a phenoxyalkyl group and a phenylthioalkyl group is the same as the substituent which may be possessed by a phenyl group included in $R^{c5}$.

Among monovalent organic groups, $R^{c5}$ is preferably an alkyl group, a cycloalkyl group, a phenyl group which may have a substituent or cycloalkylalkyl group, or a phenylthioalkyl group which may have a substituent on an aromatic ring. The alkyl group is preferably an alkyl group having 1 or more and 20 or less carbon atoms, more preferably, an alkyl group having 1 or more and 8 or less carbon atoms, particularly preferably, an alkyl group having 1 or more and 4 or less carbon atoms, and most preferably a methyl group. Among phenyl groups which may have a substituent, a methylphenyl group is preferable and a 2-methylphenyl group is more preferable. The number of carbon atoms of the cycloalkyl group included in the cycloalkylalkyl group is preferably 5 or more and 10 or less, more preferably 5 or more and 8 or less, and particularly preferably 5 or 6. The number of carbon atoms of the alkylene group included in the cycloalkylalkyl group is preferably 1 or more and 8 or less, more preferably 1 or more and 4 or less, and particularly preferably 2. Among cycloalkylalkyl groups, a cyclopentylethyl group is preferable. The number of carbon atoms of the alkylene group which may have a substituent on an aromatic ring included in the phenylthioalkyl group, is preferably 1 or more and 8 or less, more preferably 1 or more and 4 or less, and particularly preferably 2. Among the phenylthioalkyl group which may have a substituent on an aromatic ring, a 2-(4-chlorophenylthio)ethyl group is preferable.

In a group represented by the formula (c3), when a plurality of $R^{c5}$ is present and the plurality of $R^{c5}$ is bonded to each other to form a ring, examples of the ring to be formed include a hydrocarbon ring, a heterocycle, and the like. Examples of heteroatoms included in the heterocycle include N, O, and S. As the ring formed by bonding of the plurality of the plurality of $R^{c5}$, an aromatic ring is particularly preferable. Such an aromatic ring may be an aromatic hydrocarbon ring, or an aromatic heterocycle. As such an aromatic ring, an aromatic hydrocarbon ring is preferable. In the formula (c3), specific examples of a case where the plurality of $R^{c5}$ is bonded to each other to form a benzene ring are shown below.

[Chem. 14]

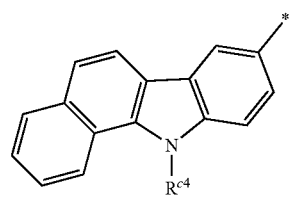

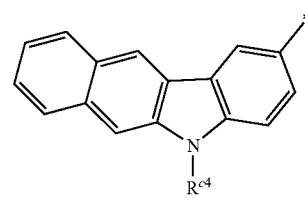

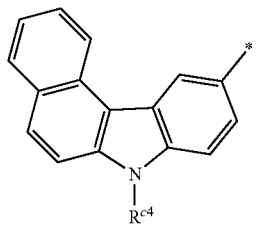

In a group represented by the formula (c4), $R^{c8}$ is a nitro group or a monovalent organic group. $R^{c8}$ is bonded to a 6-membered aromatic ring, which is different from a 6-membered aromatic ring bonded to a group represented by $-(CO)_{n1}-$, on a fused ring in the formula (c4). In the formula (c4), a bonding site of $R^{c8}$ is not particularly limited. When the group represented by the formula (c4) has one or more $R^{c8}$s, one of one or more $R^{c8}$s is preferably bonded at the 7-position in the fluorene skeleton since it is easy to synthesize the compound represented by the formula (c4). In other words, when a group represented by the formula (c4) has one or more $R^{c8}$s, the group represented by the formula (c4) is preferably represented by the following formula (c6). When a plurality of $R^{c8}$s is present, the plurality of $R^{c8}$s may be the same as or different from each other.

[Chem. 15]

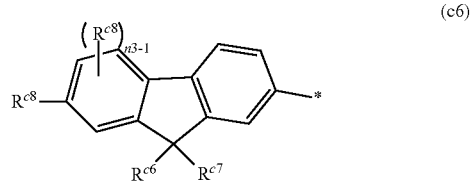

(c6)

(In the formula (c6), $R^{c6}$, $R^{c7}$, $R^{c8}$, and n3 each is the same as $R^{c6}$, $R^{c7}$, $R^{c8}$, and n3 in the formula (c4))

When $R^{c8}$ is a monovalent organic group, $R^{c8}$ is not particularly limited as long as the object of the present invention is not inhibited. As the organic group, a carbon atom-containing group is preferable, and a group including one or more carbon atoms and a group including one or more atoms selected from the group consisting of H, O, S, Se, N, B, P, Si, and a halogen atom is more preferable. The number of carbon atoms in a carbon atom-containing group is not particularly limited, but the number is preferably 1 or more and 50 or less, and more preferably 1 or more and 20 or less. Suitable examples of a case where $R^{c8}$ is a monovalent organic group include the same as suitable examples of the monovalent organic group as $R^{c5}$ in the formula (c3).

In the formula (c4), $R^{c6}$ and $R^{c7}$ each is a chain alkyl group which may have a substituent, a chain alkoxy group which may have a substituent, a cyclic organic group which may have a substituent, or a hydrogen atom. $R^{c6}$ and $R^{c7}$ may be bonded to each other to form a ring. Among these groups, $R^{c6}$ and $R^{c7}$ are preferably chain alkyl groups which may have a substituent. When $R^{c6}$ and $R^{c7}$ are chain alkyl groups which may have a substituent, chain alkyl group may be linear or branched.

When $R^{c6}$ and $R^{c7}$ are a chain alkyl group having no substituent, the number of carbon atoms of the chain alkyl group is preferably 1 or more and 20 or less, more preferably 1 or more and 10 or less, and particularly preferably 1 or more and 6 or less. When $R^{c6}$ and $R^{c7}$ are chain alkyl groups, specific examples include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, and an isodecyl group. When $R^{c6}$ and $R^{c7}$ are alkyl groups, the alkyl group may include an ether bond (—O—) in the carbon chain. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, and a methoxypropyl group.

When $R^{c6}$ and $R^{c7}$ are chain alkyl groups having a substituent, the number of carbon atoms of the chain alkyl group is preferably 1 or more and 20 or less, more preferably 1 or more and 10 or less, and particularly preferably 1 or more and 6 or less. In this case, the number of carbon atoms of the substituent is not included in the number of carbon atoms of the chain alkyl group. The chain alkyl group having a substituent is preferably linear.

There is no particular limitation on the substituent which may be possessed by the alkyl group as long as the object of the present invention is not inhibited. Suitable examples of the substituent include an alkoxy group, a cyano group, a halogen atom, a halogenated alkyl group, a cyclic organic group, and an alkoxycarbonyl group. Examples of the halogen atom include a fluorine atom, a chlorine atom, a bromine atom, and an iodine atom. Among these, a fluorine atom, a chlorine atom, and a bromine atom are preferable. Examples of the cyclic organic group include a cycloalkyl group, an aromatic hydrocarbon group, and a heterocyclyl group. Specific examples of the cycloalkyl group are the same as suitable examples in the case where $R^{c8}$ is a cycloalkyl group. Specific examples of the aromatic hydrocarbon group include a phenyl group, a naphthyl group, a biphenylyl group, an anthryl group, and a phenanthryl group. Specific examples of the heterocyclyl group are the same as suitable examples when $R^{c8}$ is a heterocyclyl group. When $R^{c8}$ is an alkoxycarbonyl group, an alkoxy group contained in the alkoxycarbonyl group may be linear or branched, and is preferably linear. The number of carbon atoms of the alkoxy group included in the alkoxycarbonyl group is preferably 1 or more and 10 or less, and more preferably 1 or more and 6 or less.

When the chain alkyl group has a substituent, the number of substituents is not particularly limited. The preferable number of substituents varies depending on the number of carbon atoms of the chain alkyl group. The number of substituents is typically 1 or more and 20 or less, preferably 1 or more and 10 or less, and more preferably 1 or more and 6 or less.

When $R^{c6}$ and $R^{c7}$ are a chain alkoxy group having no substituent, the number of carbon atoms of the chain alkoxy group is preferably 1 or more and 20 or less, more preferably 1 or more and 10 or less, and particularly preferably 1 or more and 6 or less. When $R^{c6}$ and $R^{c7}$ are a chain alkoxy group, specific examples include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, an isodecyloxy group, and the like. When $R^{c6}$ and $R^{c7}$ are an alkoxy group, the alkoxy group may include an ether bond (—O—) in the carbon chain. Examples of the alkoxy group having an ether bond in the carbon chain include a methoxyethoxy group, an ethoxyethoxy group, a methoxyethoxyethoxy group, an ethoxyethoxyethoxy group, a propyloxyethoxyethoxy group, and a methoxypropyloxy group.

When $R^{c6}$ and $R^{c7}$ are a chain alkoxy group having a substituent, substituents which may be possessed by the alkoxy group are the same as those in a case where $R^{c6}$ and $R^{c7}$ are a chain alkyl group.

When $R^{c6}$ and $R^{c7}$ are a cyclic organic group, the cyclic organic group may be an alicyclic group or an aromatic group. Examples of the cyclic organic group include an aliphatic cyclic hydrocarbon group, an aromatic hydrocarbon group, and a heterocyclyl group. When $R^{c6}$ and $R^{c7}$ are cyclic organic groups, the substituent which may be possessed by the cyclic organic group is the same as that in the case where $R^{c6}$ and $R^{c7}$ are chain alkyl groups.

When $R^{c6}$ and $R^{c7}$ are aromatic hydrocarbon groups, the aromatic hydrocarbon group is preferably a phenyl group formed by bonding of a plurality of benzene rings via a carbon-carbon bond, or a group formed by fusion of a plurality of benzene rings. When the aromatic hydrocarbon group is a phenyl group, or a group formed by bonding or fusion of plural benzene rings, the number of benzene rings included in the aromatic hydrocarbon group is not particularly limited, and is preferably 3 or less, more preferably 2 or less, and particularly preferably 1. Preferable specific examples of the aromatic hydrocarbon group include a phenyl group, a naphthyl group, a biphenylyl group, an anthryl group, and a phenanthryl group.

When $R^{c6}$ and $R^{c7}$ are aliphatic cyclic hydrocarbon groups, the aliphatic cyclic hydrocarbon group may be any one of monocyclic or polycyclic hydrocarbon groups. The number of carbon atoms of the aliphatic cyclic hydrocarbon group is not particularly limited, and is preferably 3 or more and 20 or less, and more preferably 3 or more and 10 or less.

Examples of the monocyclic cyclic hydrocarbon group include a cyclopropyl group, a cyclobutyl group, a cyclopentyl group, a cyclohexyl group, a cycloheptyl group, a cyclooctyl group, a norbornyl group, an isobornyl group, a tricyclononyl group, a tricyclodecyl group, a tetracyclodecyl group, and an adamantyl group.

When $R^{c6}$ and $R^{c7}$ are heterocyclyl groups, the heterocyclyl groups are the same as those as $R^{c5}$ in the formula (c3).

$R^{c6}$ and $R^{c7}$ may be bonded to one another to form a ring. The group composed of the ring formed by $R^{c6}$ and $R^{c7}$ is preferably a cycloalkylidene group. When $R^{c6}$ and $R^{c7}$ are bonded to form a cycloalkylidene group, the ring constituting the cycloalkylidene group is preferably a 5- to 6-membered ring, and more preferably a 5-membered ring.

When $R^{c7}$ and a benzene ring of the fluorene skeleton form a ring, the ring may be an aromatic ring or an aliphatic ring.

When the group formed by bonding $R^{c6}$ and $R^{c7}$ is a cycloalkylidene group, the cycloalkylidene group may be fused with one or more other rings. Examples of the ring which may be fused with the cycloalkylidene group include a benzene ring, a naphthalene ring, a cyclobutane ring, a cyclopentane ring, a cyclohexane ring, a cycloheptane ring, a cyclooctane ring, a furan ring, a thiophene ring, a pyrrole ring, a pyridine ring, a pyrazine ring, and a pyrimidine ring.

Examples of suitable groups among $R^{c6}$ and $R^{c2}$ described above include a group represented by the formula: -$A^1$-$A^2$. In the formula, $A^1$ is a linear alkylene group, and $A^2$ is an alkoxy group, a cyano group, a halogen atom, a halogenated alkyl group, a cyclic organic group, or an alkoxycarbonyl group.

The number of carbon atoms of the linear alkylene group for $A^1$ is preferably 1 or more and 10 or less, and more preferably 1 or more and 6 or less. When $A^2$ is an alkoxy group, the alkoxy group may be linear or branched alkoxy groups, and preferably a linear alkoxy group. The number of carbon atoms of the alkoxy group is preferably 1 or more and 10 or less, and more preferably 1 or more and 6 or less. When $A^2$ is a halogen atom, a fluorine atom, a chlorine atom, a bromine atom, or an iodine atom is preferable, and a fluorine atom, a chlorine atom, or a bromine atom is more preferable. When $A^2$ is a halogenated alkyl group, the halogen atom included in the halogenated alkyl group is preferably a fluorine atom, a chlorine atom, a bromine atom, or an iodine atom, and more preferably a fluorine atom, a chlorine atom, or a bromine atom. The halogenated alkyl group may be linear or branched halogenated alkyl groups, and preferably a linear halogenated alkyl group. When $A^2$ is a cyclic organic group, examples of the cyclic organic group are the same as the cyclic organic group possessed by $R^{c6}$ and $R^{c7}$ as the substituent. When $A^2$ is an alkoxycarbonyl group, examples of the alkoxycarbonyl group are the same as the alkoxycarbonyl group possessed by $R^{c6}$ and $R^{c7}$ as the substituent.

Suitable specific examples of $R^{c6}$ and $R^{c7}$ include alkyl groups such as an ethyl group, an n-propyl group, an n-butyl group, an n-hexyl group, an n-heptyl group, and an n-octyl group; alkoxyalkyl groups such as a 2-methoxyethyl group, a 3-methoxy-n-propyl group, a 4-methoxy-n-butyl group, a 5-methoxy-n-pentyl group, a 6-methoxy-n-hexyl group, a 7-methoxy-n-heptyl group, an 8-methoxy-n-octyl group, a 2-ethoxyethyl group, a 3-ethoxy-n-propyl group, a 4-ethoxy-n-butyl group, a 5-ethoxy-n-pentyl group, a 6-ethoxy-n-hexyl group, a 7-ethoxy-n-heptyl group, and an 8-ethoxy-n-octyl group; cyanoalkyl groups such as a 2-cyanoethyl group, a 3-cyano-n-propyl group, a 4-cyano-n-butyl group, a 5-cyano-n-pentyl group, a 6-cyano-n-hexyl group, a 7-cyano-n-heptyl group, and an 8-cyano-n-octyl group; phenyl alkyl groups such as a 2-phenylethyl group, a 3-phenyl-n-propyl group, a 4-phenyl-n-butyl group, a 5-phenyl-n-pentyl group, a 6-phenyl-n-hexyl group, a 7-phenyl-n-heptyl group, and an 8-phenyl-n-octyl group; cycloalkylalkyl groups such as a 2-cyclohexylethyl group, a 3-cyclohexyl-n-propyl group, a 4-cyclohexyl-n-butyl group, a 5-cyclohexyl-n-pentyl group, a 6-cyclohexyl-n-hexyl group, a 7-cyclohexyl-n-heptyl group, an 8-cyclohexyl-n-octyl group, a 2-cyclopentylethyl group, a 3-cyclopentyl-n-propyl group, a 4-cyclopentyl-n-butyl group, a 5-cyclopentyl-n-pentyl group, a 6-cyclopentyl-n-hexyl group, a 7-cyclopentyl-n-heptyl group, and an 8-cyclopentyl-n-octyl group; alkoxycarbonylalkyl groups such as a 2-methoxycarbonylethyl group, a 3-methoxycarbonyl-n-propyl group, a 4-methoxycarbonyl-n-butyl group, a 5-methoxycarbonyl-n-pentyl group, a 6-methoxycarbonyl-n-hexyl group, a 7-methoxycarbonyl-n-heptyl group, an 8-methoxycarbonyl-n-octyl group, a 2-ethoxycarbonylethyl group, a 3-ethoxycarbonyl-n-propyl group, a 4-ethoxycarbonyl-n-butyl group, a 5-ethoxycarbonyl-n-pentyl group, a 6-ethoxycarbonyl-n-hexyl group, a 7-ethoxycarbonyl-n-heptyl group, and an 8-ethoxycarbonyl-n-octyl group; and halogenated alkyl groups such as a 2-chloroethyl group, a 3-chloro-n-propyl group, a 4-chloro-n-butyl group, a 5-chloro-n-pentyl group, a 6-chloro-n-hexyl group, a 7-chloro-n-heptyl group, an 8-chloro-n-octyl group, a 2-bromoethyl group, a 3-bromo-n-propyl group, a 4-bromo-n-butyl group, a 5-bromo-n-pentyl group, a 6-bromo-n-hexyl group, a 7-bromo-n-heptyl group, an 8-bromo-n-octyl group, a 3,3,3-trifluoropropyl group, and a 3,3,4,4,5,5,5-heptafluoro-n-pentyl group.

Among the groups mentioned above, groups suitable as $R^{c6}$ and $R^{c7}$ are an ethyl group, an n-propyl group, an n-butyl group, an n-pentyl group, a 2-methoxyethyl group, a 2-cyanoethyl group, a 2-phenylethyl group, a 2-cyclohexylethyl group, a 2-methoxycarbonylethyl group, a 2-chloroethyl group, a 2-bromoethyl group, a 3,3,3-trifluoropropyl group, and a 3,3,4,4,5,5,5-heptafluoro-n-pentyl group.

In the formula (c5), A is particularly preferably S, since it is easy to form a photopolymerization initiating agent having excellent sensitivity.

In the formula (c5), $R^{c9}$ is a monovalent organic group, a halogen atom, a nitro group, or a cyano group. When $R^{c9}$ in the formula (c5) is a monovalent organic group, $R^{c9}$ can be selected from various organic groups as long as the object of the present invention is not inhibited. As the organic group, a carbon atom-containing group is preferable, one or more carbon atoms, and a group including one or more atoms selected from the group consisting of H, O, S, Se, N, B, P, Si, and a halogen atom is more preferable. The number of carbon atoms of the carbon atom-containing group is not particularly limited, but the number is preferably 1 or more and 50 or less, and more preferably 1 or more and 20 or less. In the formula (c5), suitable examples of a case where $R^{c9}$ is an organic group include the same as the monovalent organic group as $R^{c5}$ in the formula (c3).

In $R^{c9}$, a benzoyl group; a naphthoyl group; a benzoyl group substituted by a group selected from the group consisting of an alkyl group having 1 or more and 6 or less carbon atoms, a morpholin-1-yl group, a piperazin-1-yl group, and a phenyl group; a nitro group; a benzofuranyl carbonyl group which may have a substituent are preferable, a benzoyl group; a naphthoyl group; a 2-methylphenyl carbonyl group; a 4-(piperazine-1-yl)phenyl carbonyl group; a 4-(phenyl)phenyl carbonyl group are more preferable.

Furthermore, in the formula (c5), n4 is preferably an integer of 0 or more and 3 or less, more preferably an integer of 0 or more and 2 or less, and particularly preferably 0 or 1. When n4 is 1, a position to which $R^{c9}$ is bonded is preferably a para position with respect to a bond where a phenyl group to which $R^{c9}$ is bonded is bonded to an oxygen atom or a sulfur atom.

In the formulae (c1) and (c2), a monovalent organic group as $R^{c2}$ is not particularly limited as long as the object of the present invention is not inhibited. As the organic group, a carbon atom-containing group is preferable; one or more carbon atoms and a group including one or more atoms selected from the group consisting of H, O, S, Se, N, B, P, Si, and a halogen atom is more preferable. The number of carbon atoms in a carbon atom-containing group is not particularly limited, but the number is preferably 1 or more and 50 or less, and more preferably 1 or more and 20 or less. Suitable examples of monovalent organic groups as $R^{c2}$ include the same as the monovalent organic groups as $R^{c5}$ in the formula (c3). Specific examples of these groups are the same as the groups described for $R^{c5}$ in the formula (c3). Furthermore, as $R^{c2}$, a cycloalkylalkyl group, a phenoxyalkyl group which may have a substituent on an aromatic ring, and a phenylthioalkyl group which may have a substituent on an aromatic ring are preferable. The substituent which may be possessed by a phenoxyalkyl group and a phenylthioalkyl group is the same as the substituent in a case where a phenyl group, a naphthyl group, and a heterocyclyl group are included in $R^{c5}$ in the formula (c3).

Among the organic groups, as $R^{c2}$, the substituent including a group represented by $HX_2C$— or $H_2XC$— mentioned above, an alkyl group, a cycloalkyl group, a phenyl group or a cycloalkylalkyl group which may have a substituent, and a phenylthioalkyl group which may have a substituent on an aromatic ring are preferable. The number of carbon atoms of a cycloalkyl group included in an alkyl group, a phenyl group which may have a substituent, and a cycloalkylalkyl group; the number of carbon atoms of the alkylene group included in the cycloalkylalkyl group; and the number of carbon atoms of the alkylene group included in a cycloalkylalkyl group, a phenylthioalkyl group which may have a substituent on an aromatic ring, or a phenylthioalkyl group which may have a substituent on an aromatic ring, are the same as those of the $R^{c5}$ in the formula (c3).

Also, $R^{c2}$ is preferably a group represented by $-A^3-CO-O-A^4$. $A^3$ is a divalent organic group, preferably a divalent hydrocarbon group, and more preferably an alkylene group. $A^4$ is a monovalent organic group, and preferably a monovalent hydrocarbon group.

When $A^3$ is an alkylene group, the alkylene group may be may be a linear or branched alkylene group, and preferably a linear alkylene group. When $A^3$ is an alkylene group, the number of carbon atoms of the alkylene group is preferably 1 or more and 10 or less, more preferably 1 or more and 6 or less, and particularly preferably 1 or more and 4 or less.

Suitable examples of $A^4$ include an alkyl group having 1 or more and 10 or more carbon atoms, an aralkyl group having 7 or more and 20 or less carbon atoms, and an aromatic hydrocarbon group having 6 or more and 20 or less carbon atoms. Suitable specific examples of $A^4$ include a methyl group, an ethyl group, an n-propyl group, an isopropyl group, an n-butyl group, an isobutyl group, a sec-butyl group, a tert-butyl group, an n-pentyl group, an n-hexyl group, a phenyl group, a naphthyl group, a benzyl group, a phenethyl group, an α-naphthylmethyl group, and a β-naphthylmethyl group.

Suitable specific examples of the group represented by $-A^3-CO-O-A^4$ include a 2-methoxycarbonylethyl group, a 2-ethoxycarbonylethyl group, a 2-n-propyloxycarbonylethyl group, a 2-n-butyloxycarbonylethyl group, a 2-n-pentyloxycarbonylethyl group, a 2-n-hexyloxycarbonylethyl group, a 2-benzyloxycarbonylethyl group, a 2-phenoxycarbonylethyl group, a 3-methoxycarbonyl-n-propyl group, a 3-ethoxycarbonyl-n-propyl group, a 3-n-propyloxycarbonyl-n-propyl group, a 3-n-butyloxycarbonyl-n-propyl group, a 3-n-pentyloxycarbonyl-n-propyl group, a 3-n-hexyloxycarbonyl-n-propyl group, a 3-benzyloxycarbonyl-n-propyl group, and a 3-phenoxycarbonyl-n-propyl group.

While $R^{c2}$ has been described above, $R^{c2}$ is preferably a group represented by the following formulae (c7) or (c8):

[Chem. 16]

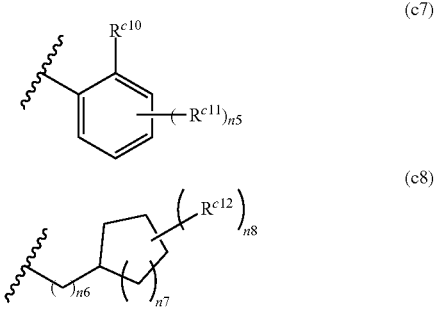

(in the formula (c7) or (c8), $R^{c10}$ and $R^{c11}$ each independently is a monovalent organic group, n5 is an integer of 0 or more and 4 or less, when $R^{c10}$ and $R^{c11}$ exist at adjacent positions on a benzene ring, $R^{c10}$ and $R^{c11}$ may be bonded to each other to form a ring, $R^{c12}$ is a monovalent organic group, n6 is an integer of 1 or more and 8 or less, n7 is an integer of 1 or more and 5 or less, and n8 is an integer of 0 or more and (n7+3) or less)

The organic groups as $R^{c10}$ and $R^{c11}$ in the formula (c7) are the same as $R^{c8}$ in the formula (c4). As $R^{c10}$, a halogenated alkoxy group including a group represented by $HX_2C$— or $H_2XC$—, a halogenated alkyl group including a group represented by $HX_2C$— or $H_2XC$—, an alkyl group or a phenyl group is preferable. When $R^{c10}$ and $R^{c11}$ are bonded to form a ring, the ring may be either one of an aromatic ring or an aliphatic ring. Suitable examples of the group represented by the formula (c7) in which $R^{c10}$ and $R^{c11}$ form a ring include a naphthalen-1-yl group, a 1,2,3,4-tetrahydronaphthalen-5-yl group, and the like. In the above formula (c7), n7 is an integer of 0 or more and 4 or less, preferably 0 or 1, and more preferably 0.

In the above formula (c8), $R^{c12}$ is an organic group. Examples of the organic group include the same group as the organic group described for $R^{c8}$ in the above formula (c4). Among the organic groups, an alkyl group is preferable. The alkyl group may be may be a linear or branched alkyl group. The number of carbon atoms of the alkyl group is preferably 1 or more and 10 or less, more preferably 1 or more and 5 or less, and particularly preferably 1 or more and 3 or less. Preferable examples of $R^{c12}$ include a methyl group, an ethyl group, a propyl group, an isopropyl group, a butyl group, and the like. Among these, a methyl group is more preferable.

In the above formula (c8), n7 is preferably an integer of 1 or more and 5 or less, more preferably an integer of 1 or more and 3 or less, and particularly preferably 1 or 2. In the above formula (c8), n8 is preferably an integer of 0 or more and (n7+3) or less, more preferably an integer of 0 or more and 3 or less, further preferably an integer of 0 or more and 2 or less, and particularly preferably 0. In the above formula (c8), n8 is preferably an integer of 1 or more and 8 or less, more preferably an integer of 1 or more and 5 or less, further preferably 1 or more and 3 or less, and particularly preferably 1 or 2.

In the formula (c2), $R^{c3}$ is a hydrogen atom, an aliphatic hydrocarbon group having 1 or more and 20 or less carbon atoms which may have a substituent, or an aryl group which may have a substituent. When $R^{c3}$ is an aliphatic hydrocarbon group, substituents which may be possessed by $R^{c3}$ preferably include a phenyl group, a naphthyl group, and the like.

In the formulae (c1) and (c2), preferable examples of $R^{c3}$ include a hydrogen atom, a methyl group, an ethyl group, an n-propyl group, an isopropyl group, an n-butyl group, a 2-cyclopentylethyl group, a 2-cyclobutylethyl group, a cyclohexylmethyl group, a phenyl group, a benzyl group, a methylphenyl group, a naphthyl group, and the like. Among them, a methyl group or a phenyl group are more preferable.

Suitable specific examples of compounds represented by the formula (c2) and having a group represented by the formula (c3) as $R^{c1}$ include the following compounds.

[Chem. 17]

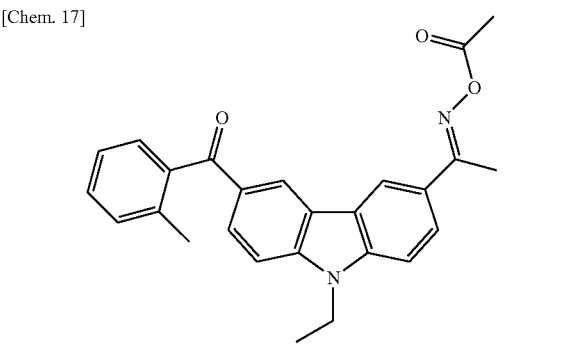

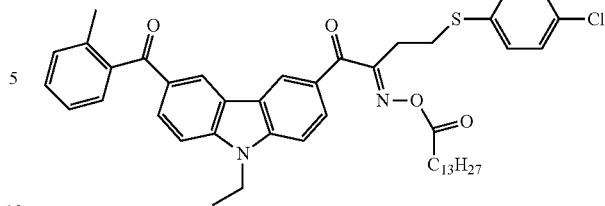

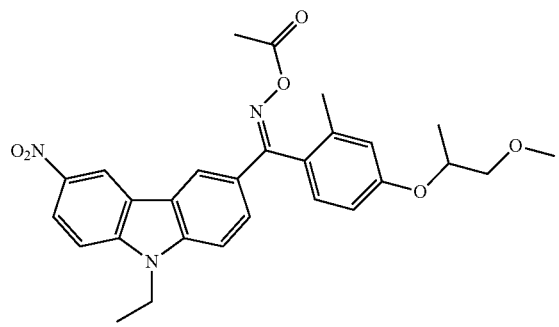

[Chem. 18]

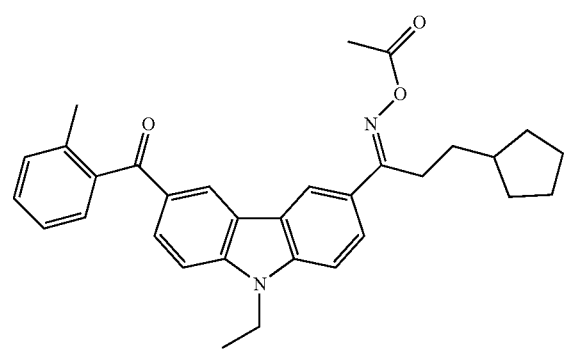

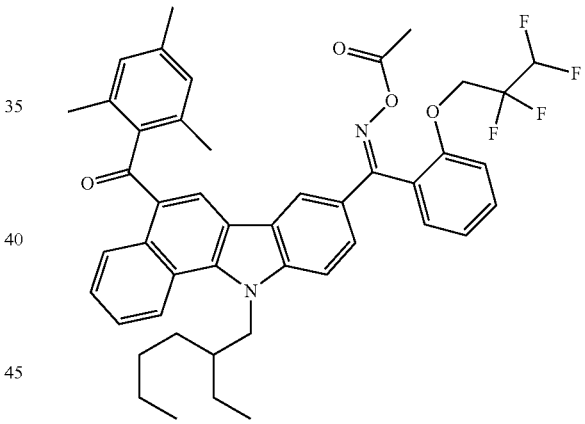

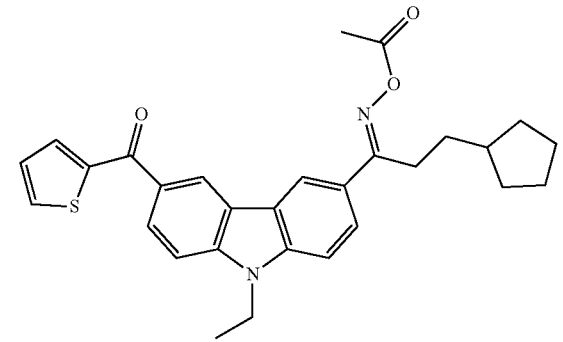

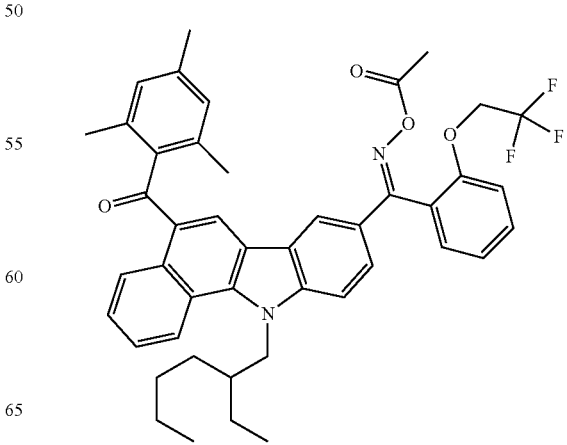

37
-continued
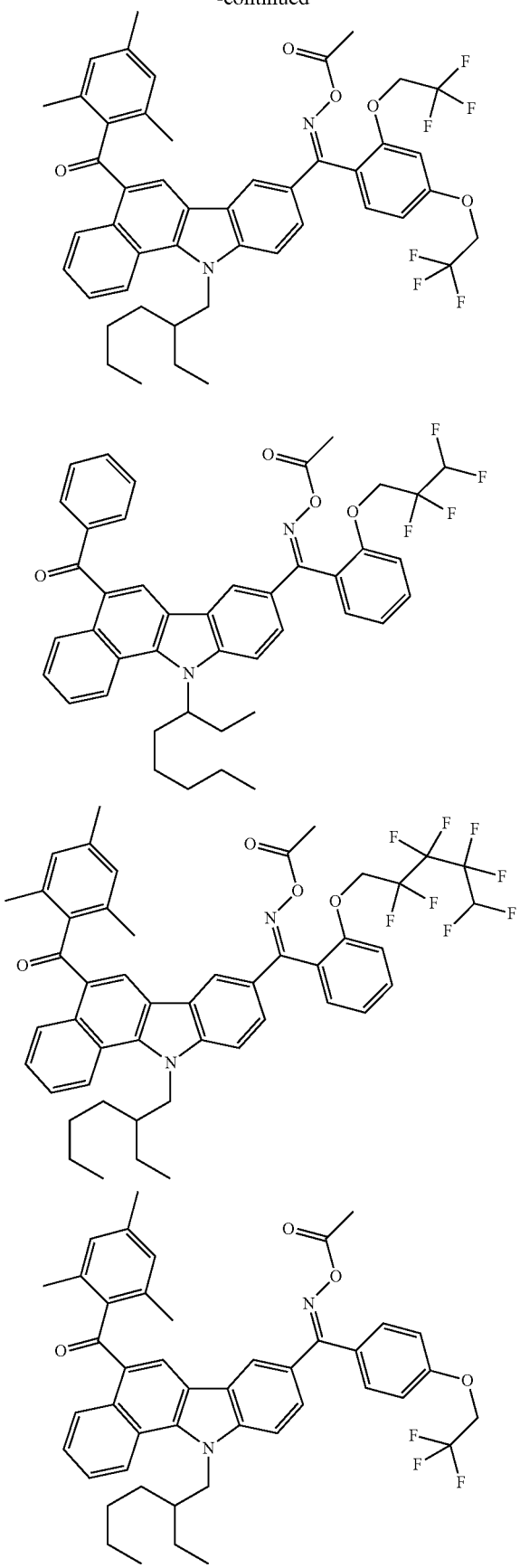
38
-continued
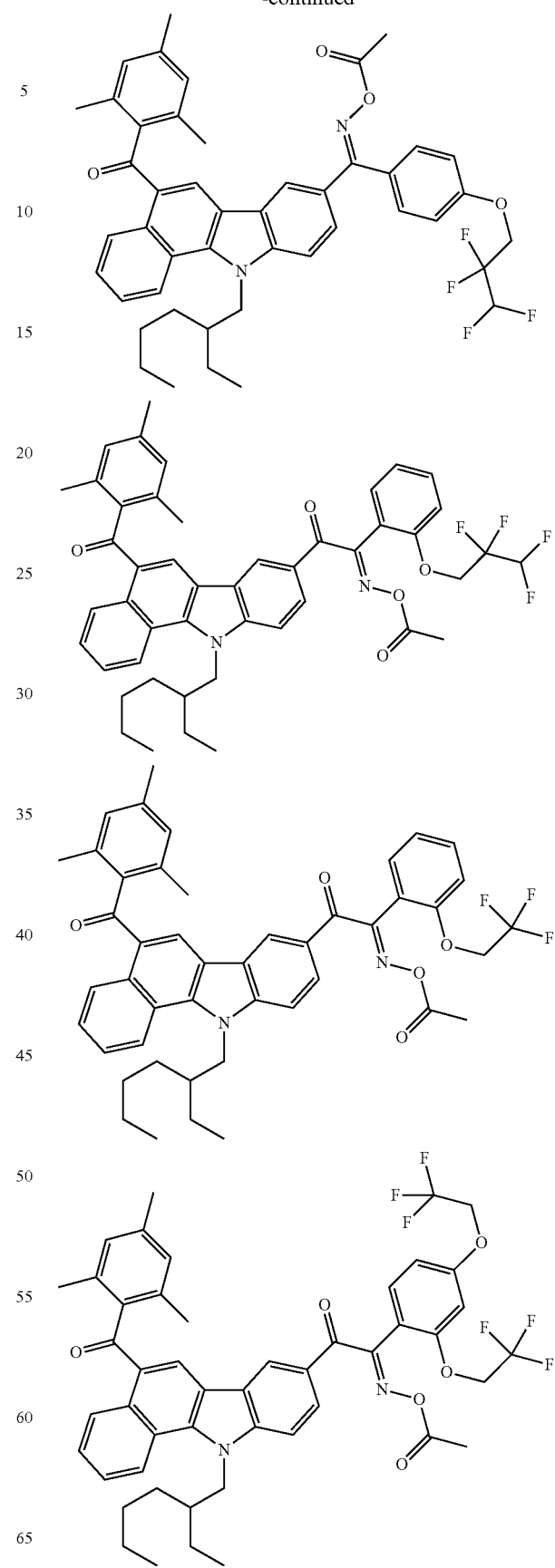

39
-continued
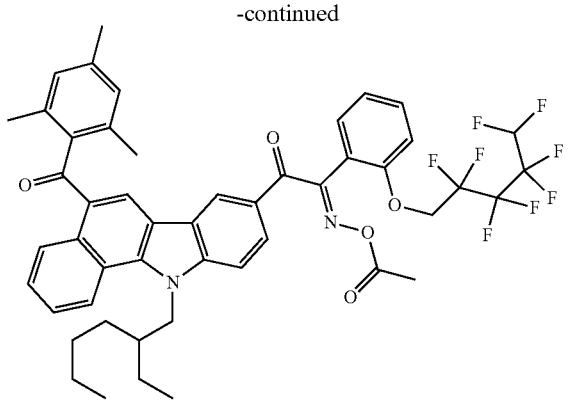
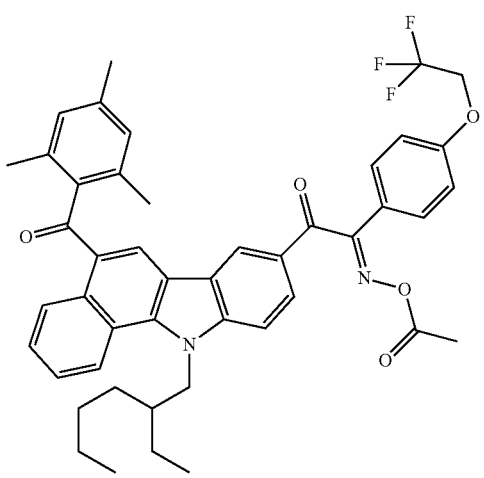
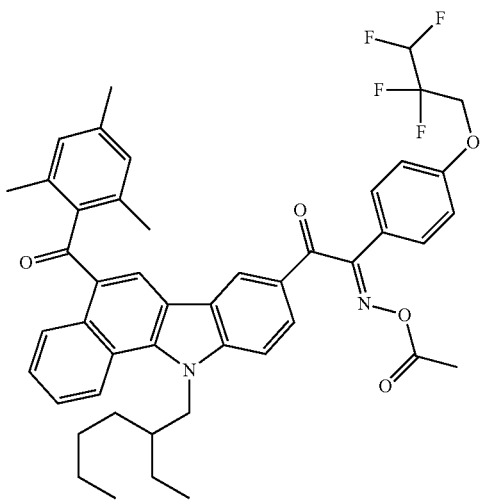
40
-continued
[Chem. 19]
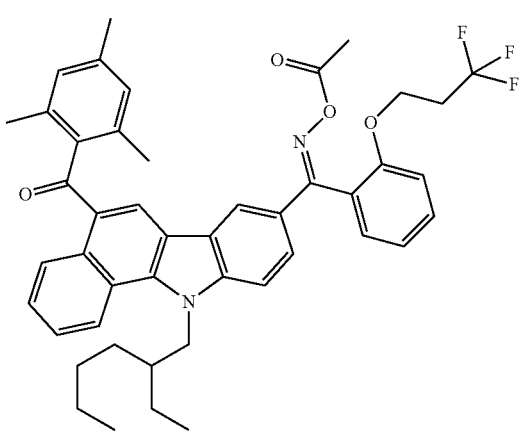
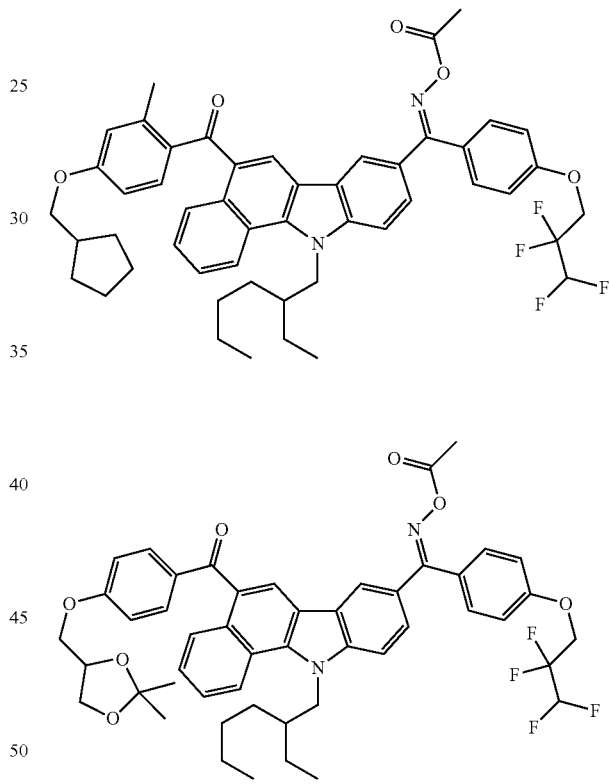
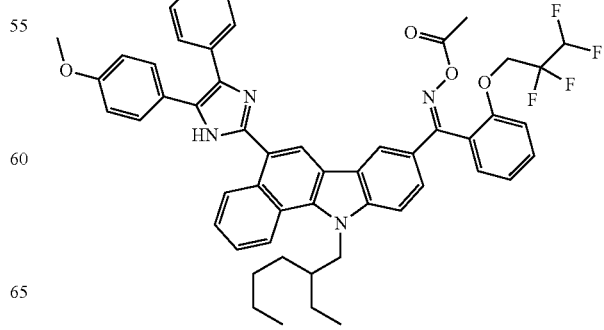

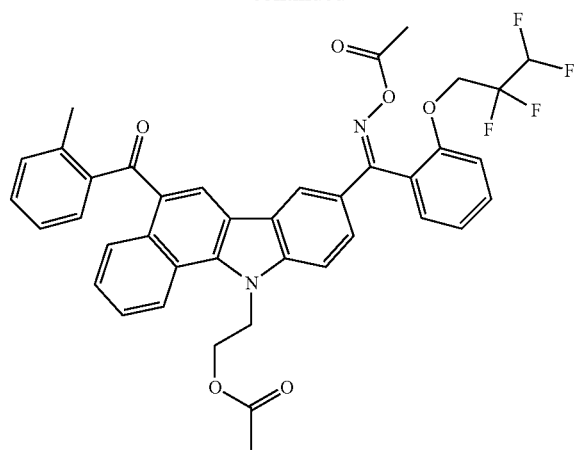
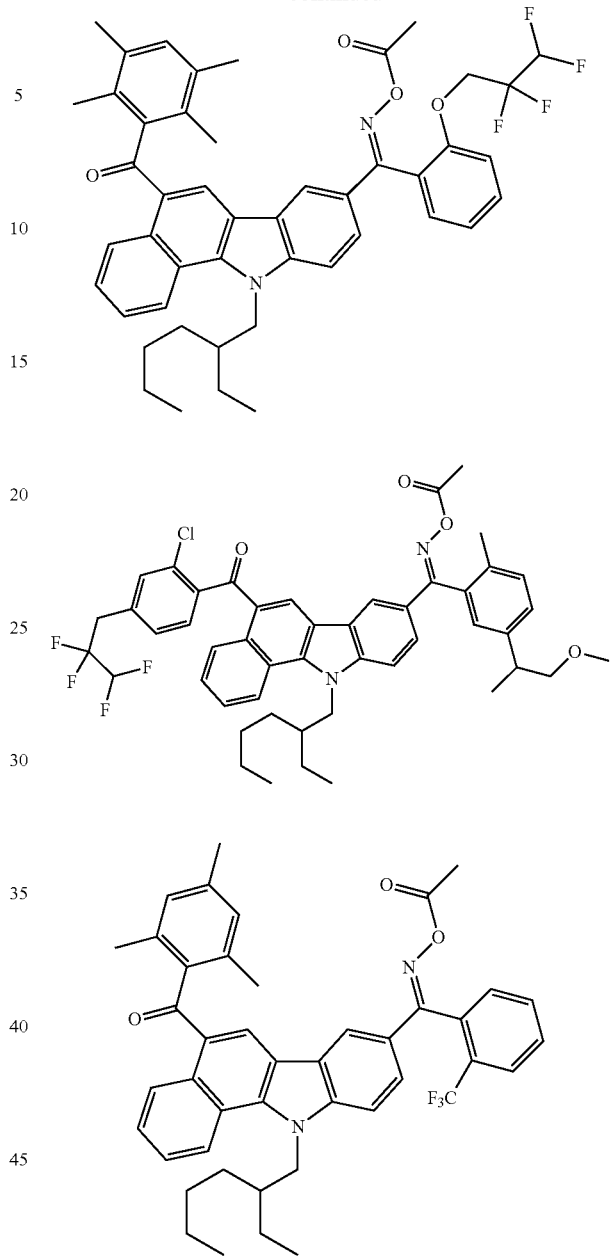
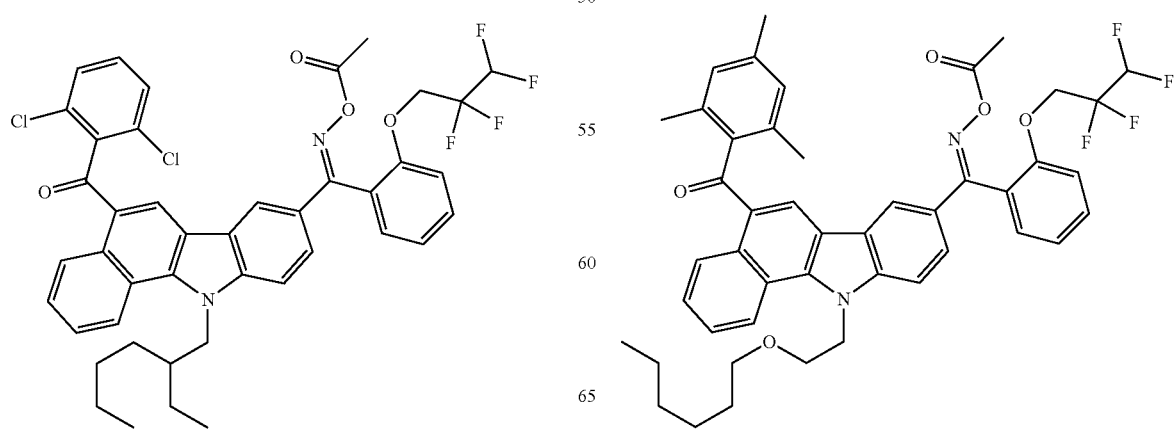
[Chem. 20]

-continued
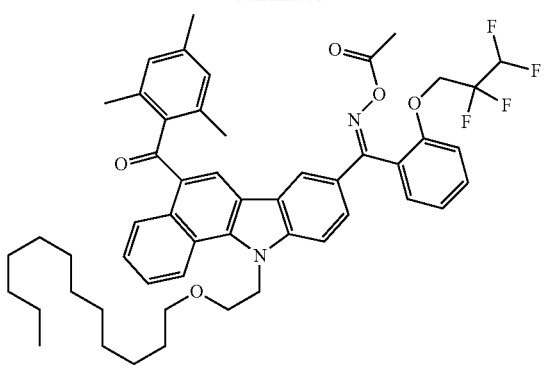
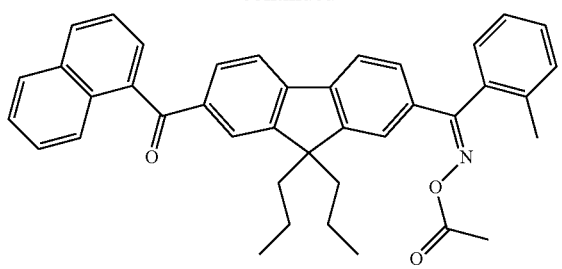
Suitable specific examples of compounds represented by the formula (c2) and having a group represented by the formula (c4) as $R^{c1}$ include the following compounds.
[Chem. 21]
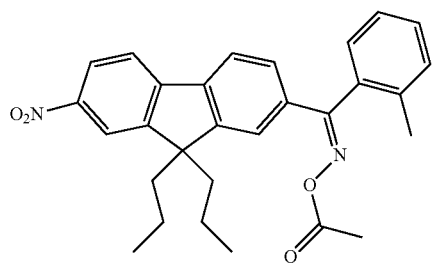
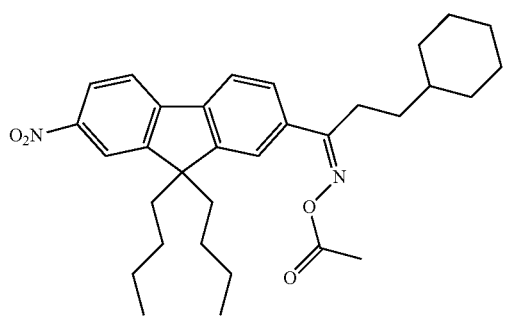
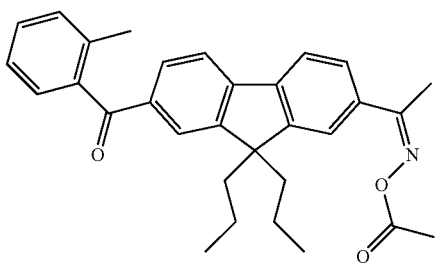
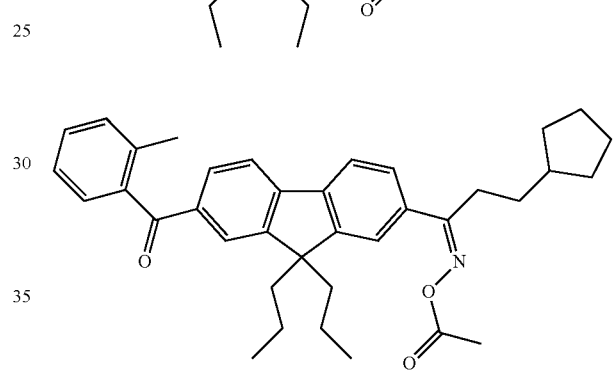
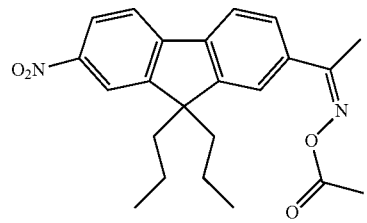
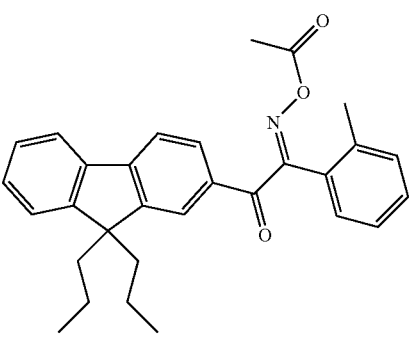
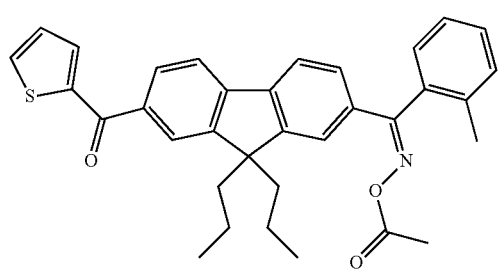
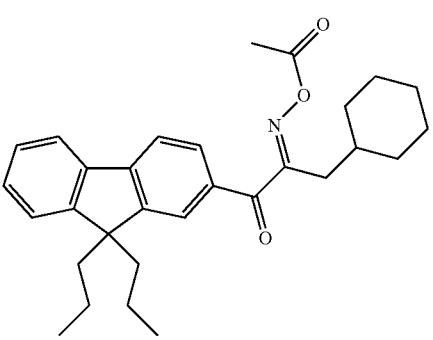

45
-continued
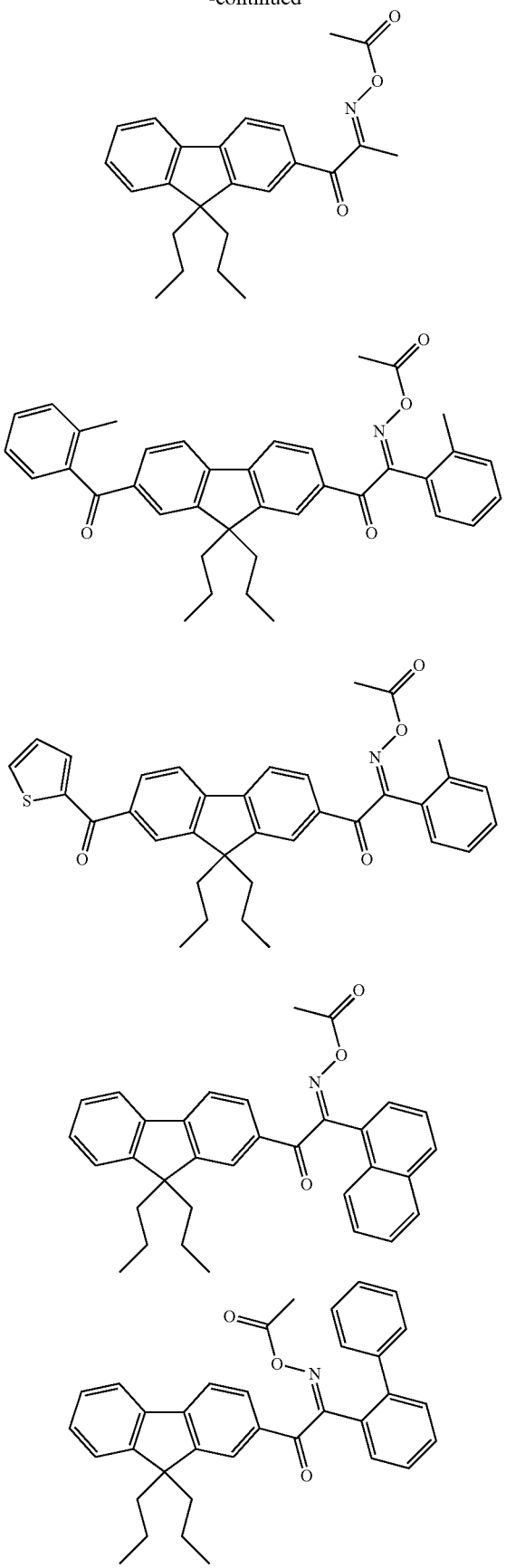
46
-continued
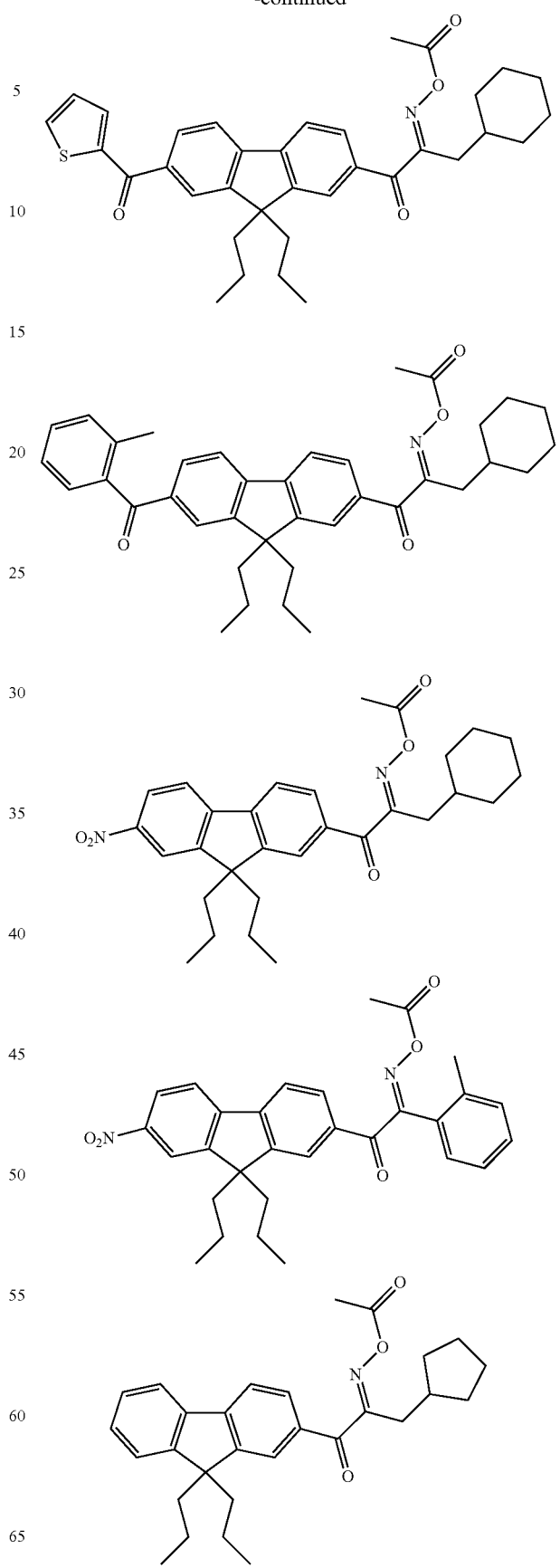

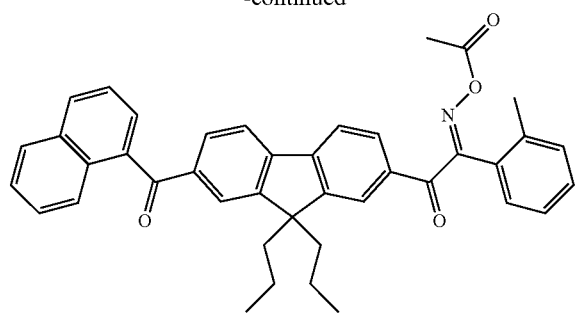
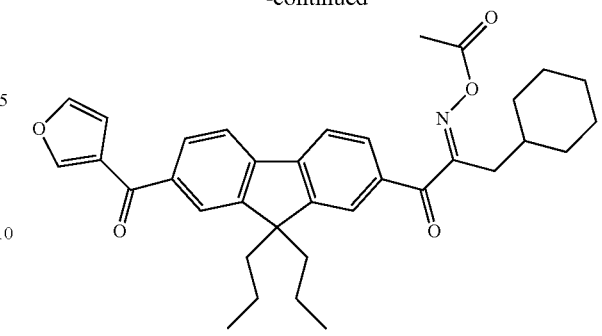
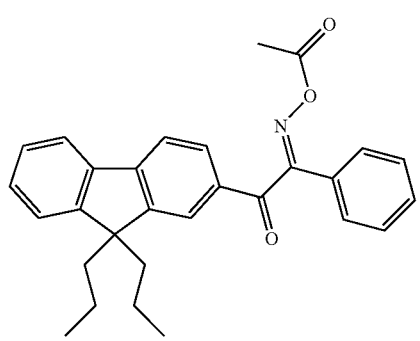
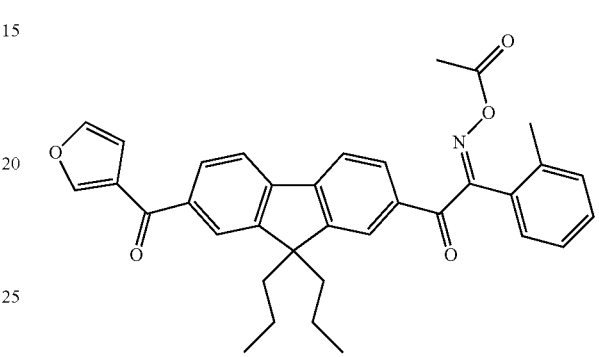
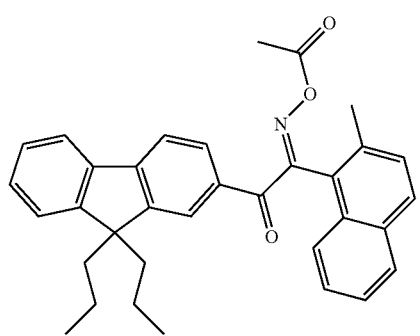
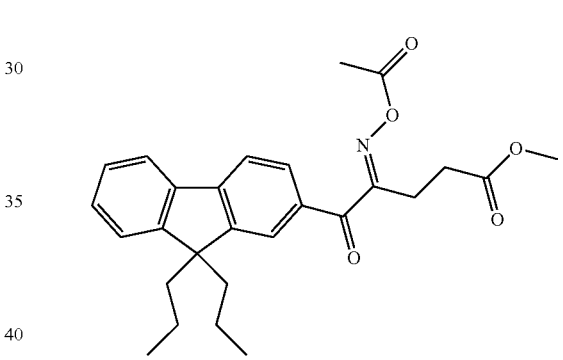
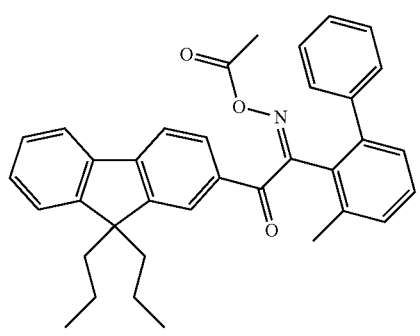
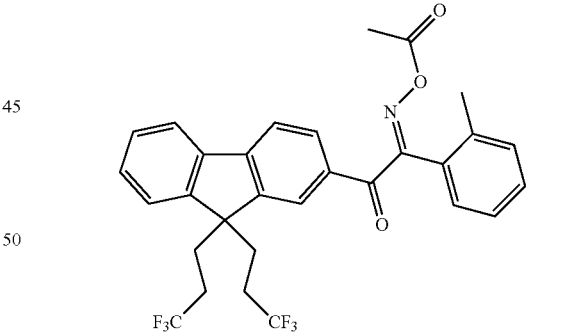
[Chem. 22]
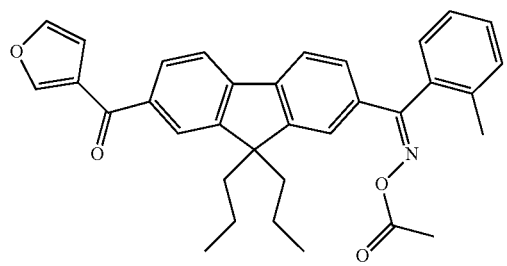
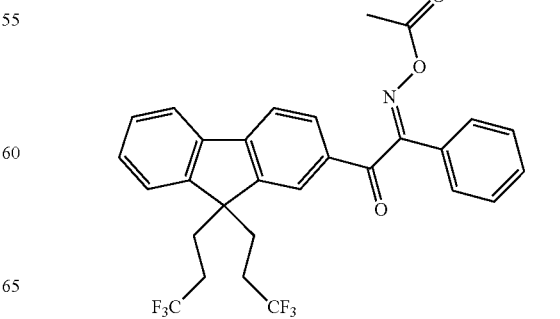

49
-continued
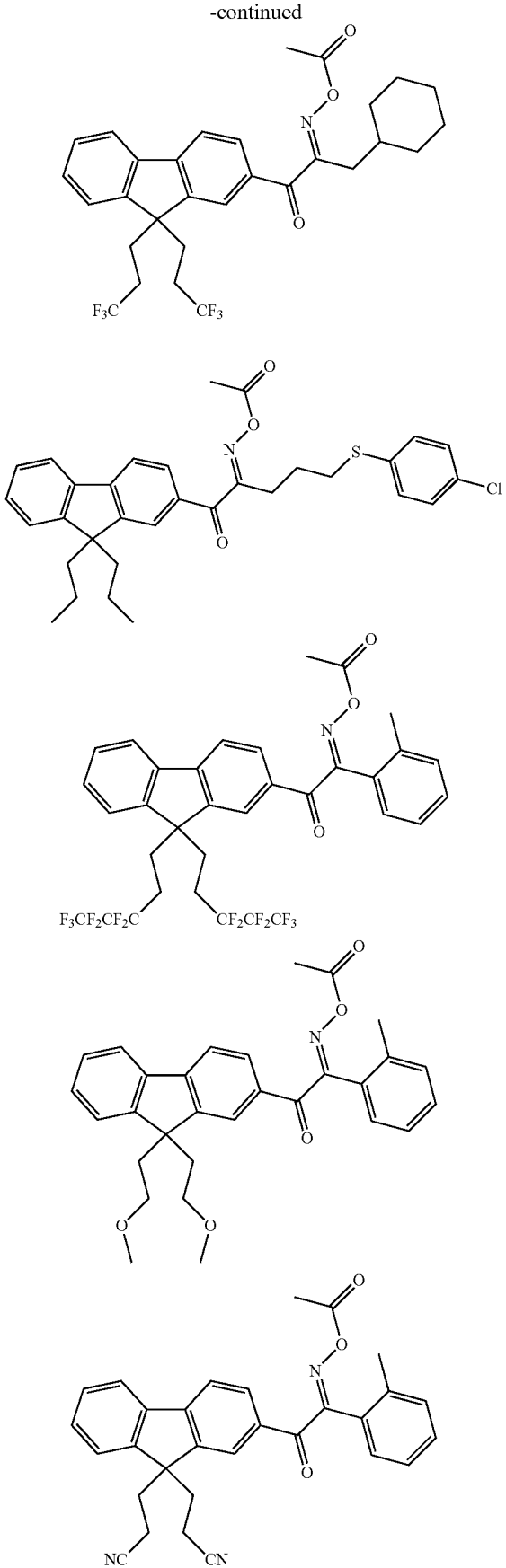
50
-continued
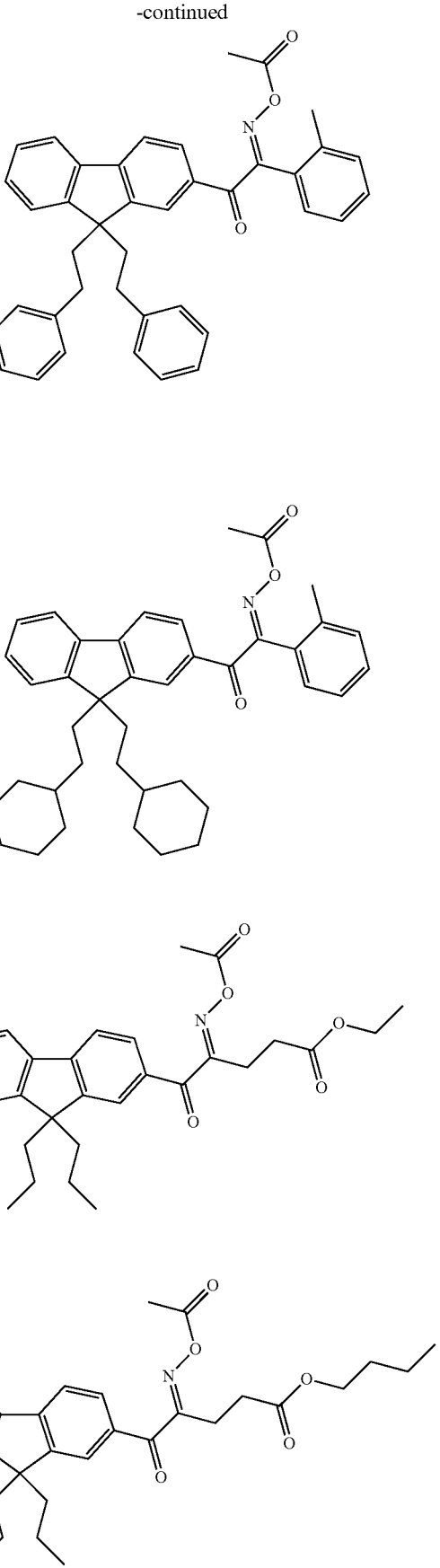

51
-continued
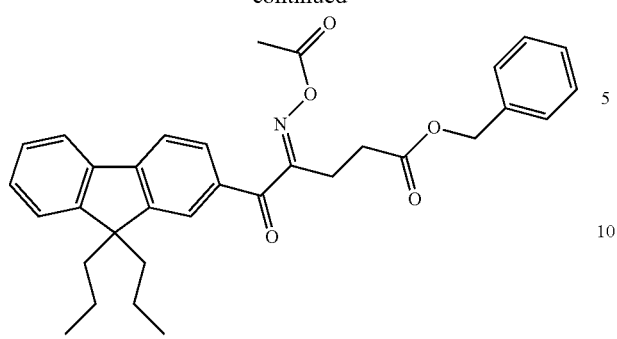
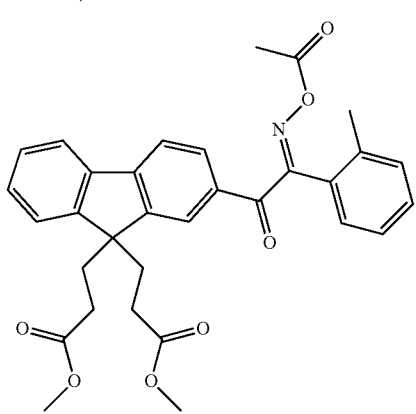
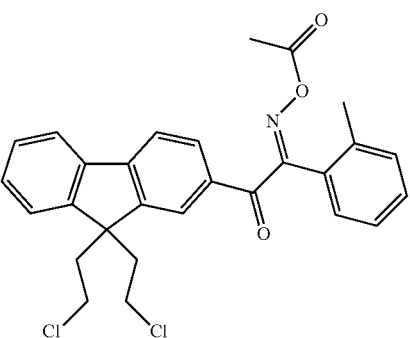
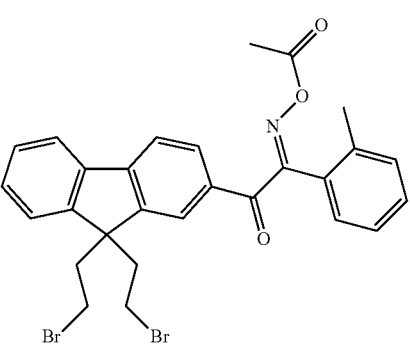
[Chem. 23]
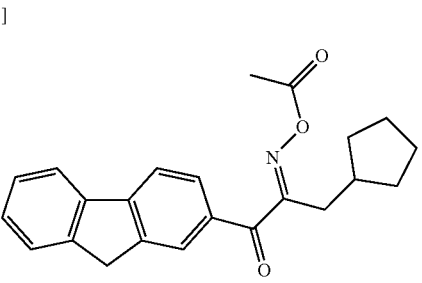
52
-continued
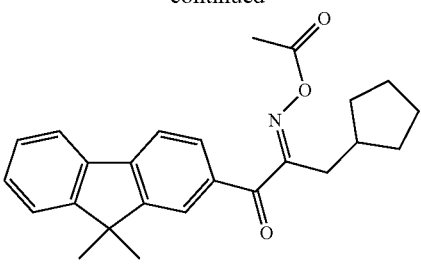
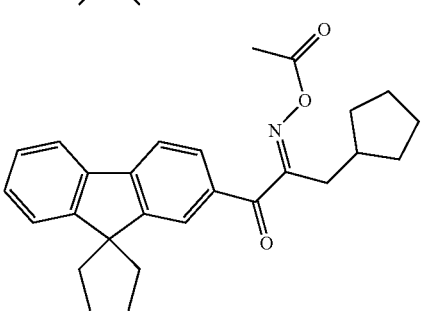
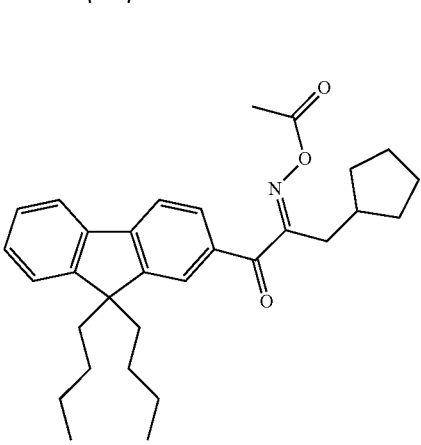
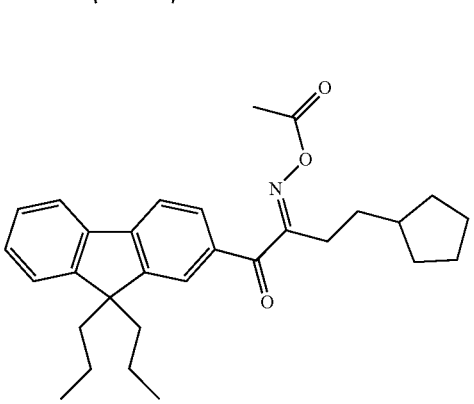
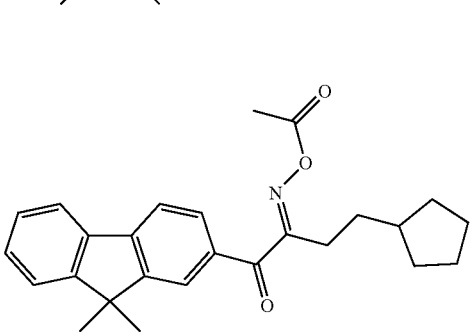

53
-continued
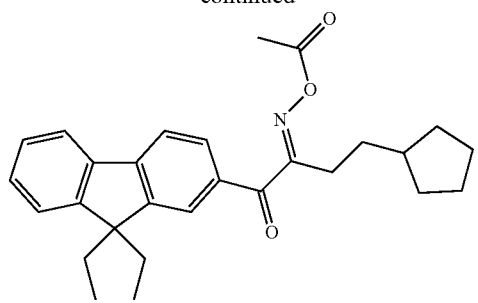
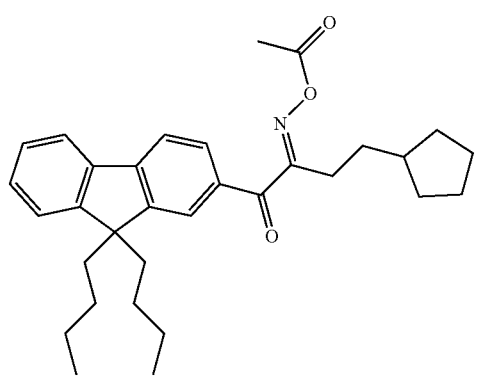
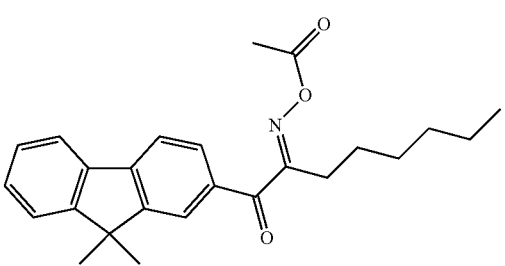
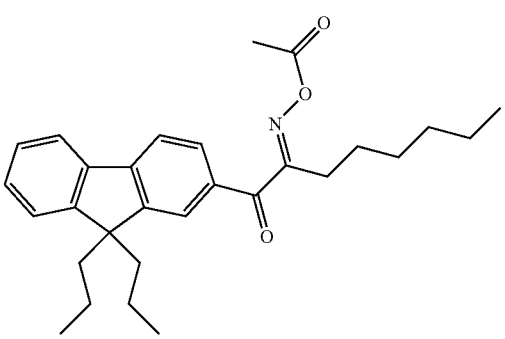
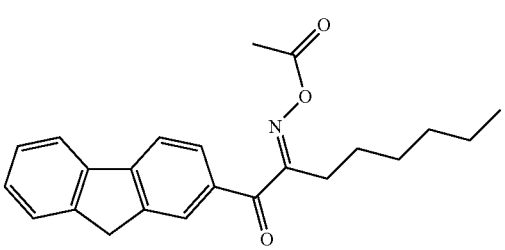
54
-continued
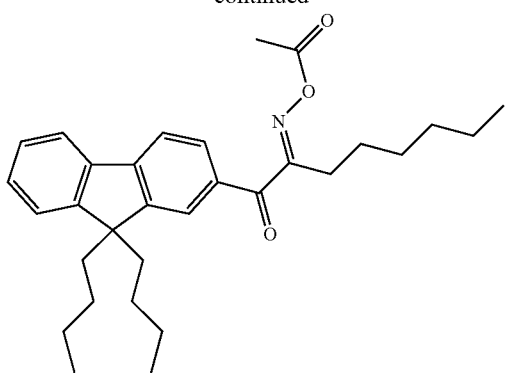
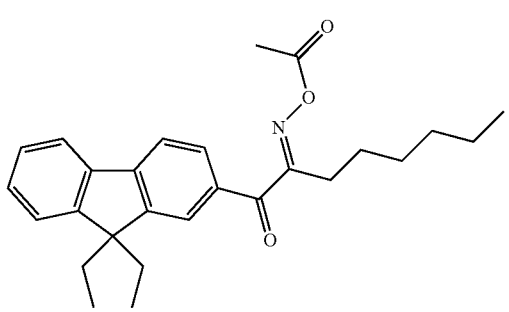
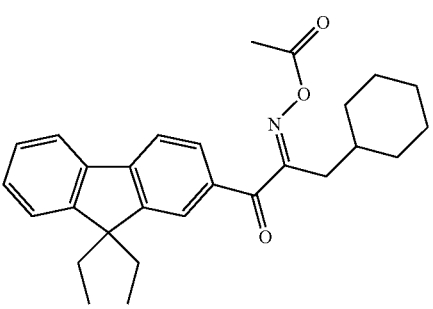
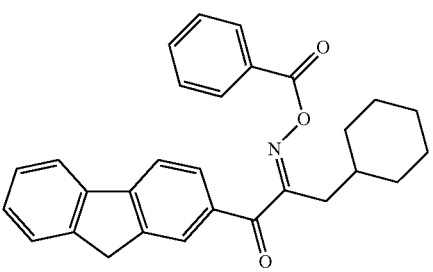
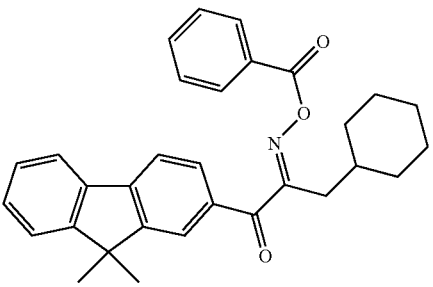

[Chem. 24]

57
-continued
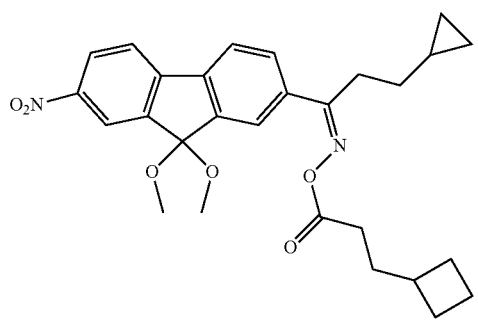
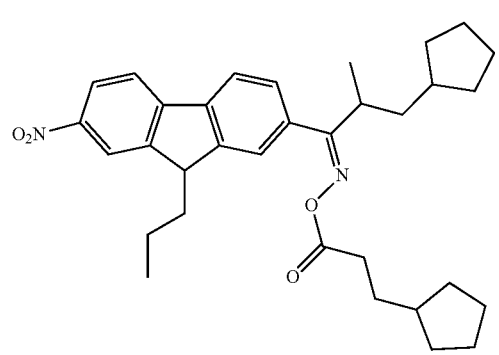
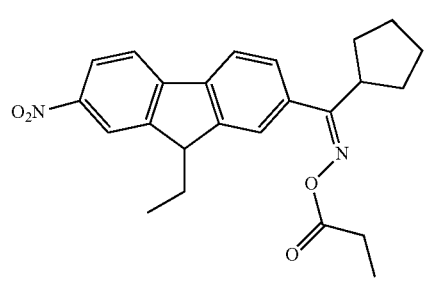
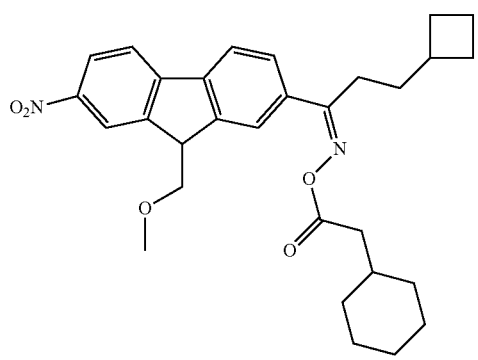
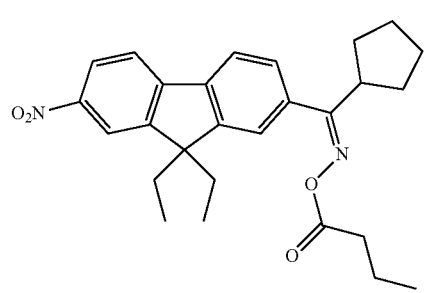
58
-continued
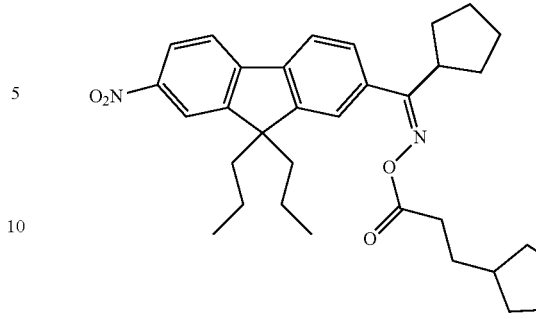
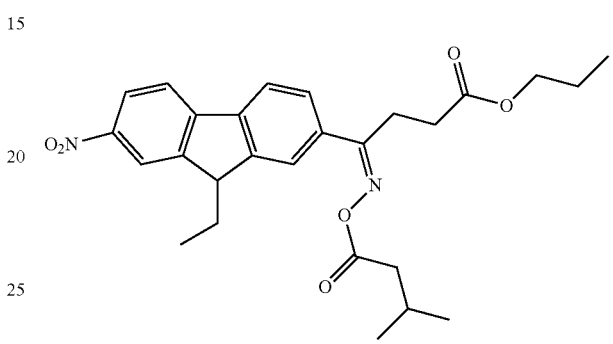
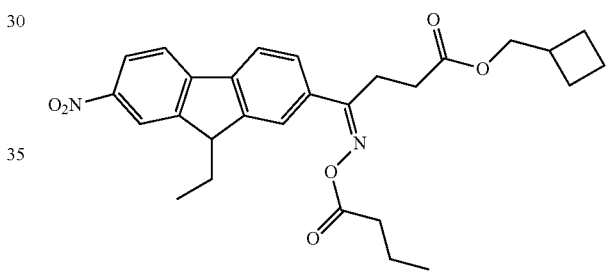
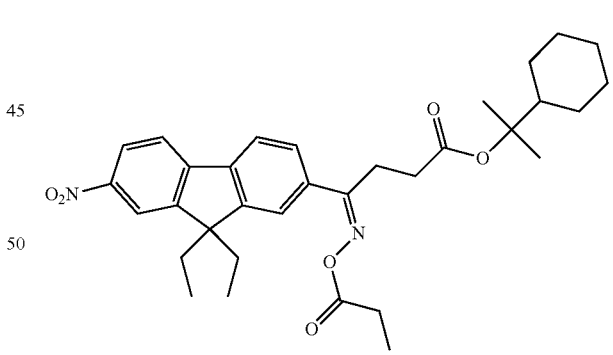
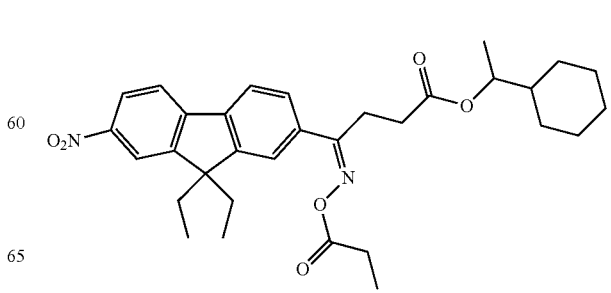

59
-continued
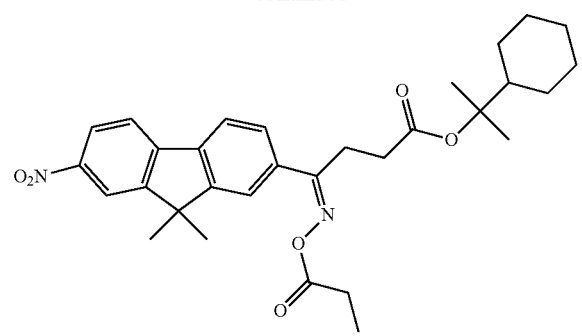
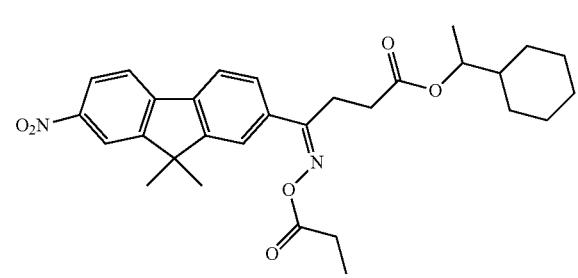
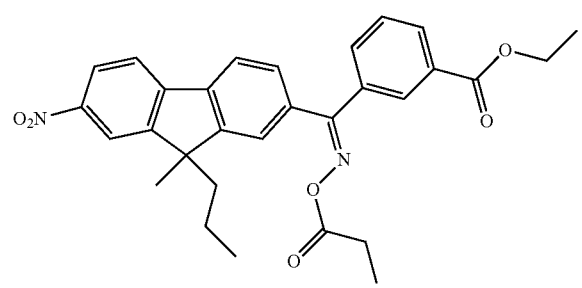
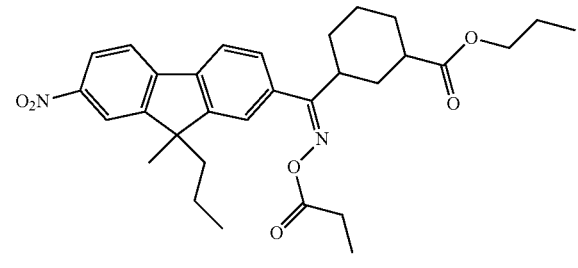
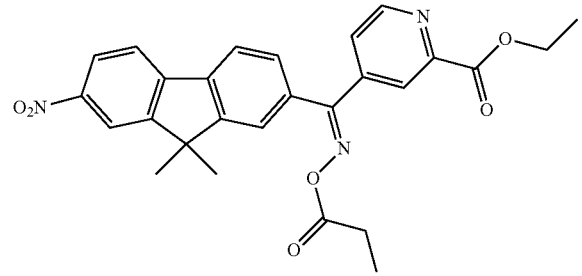
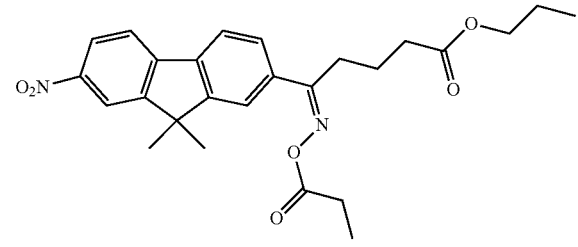
60
-continued
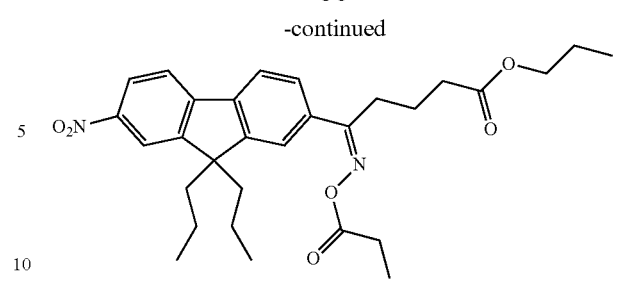
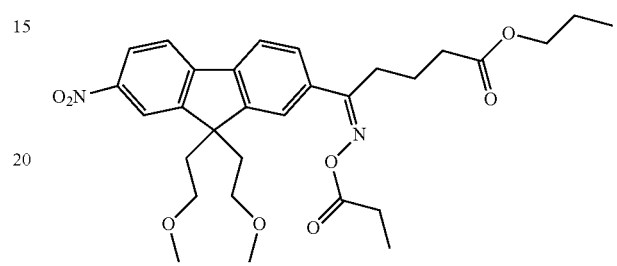
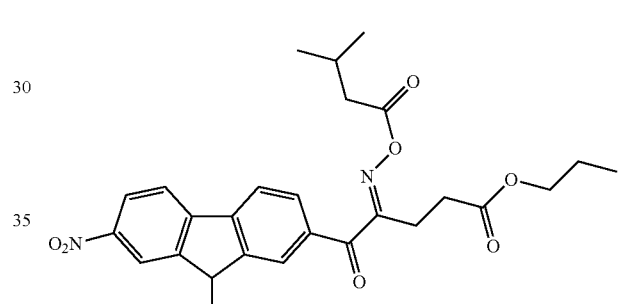
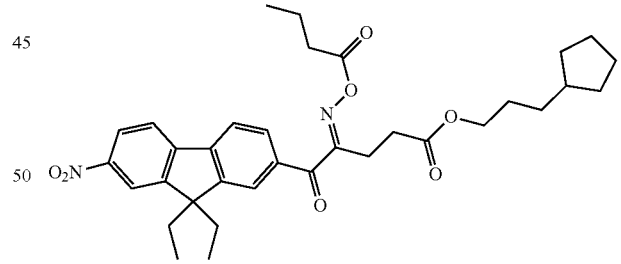
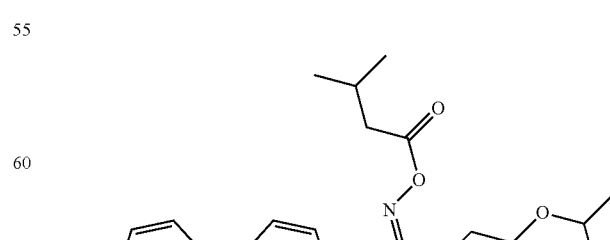
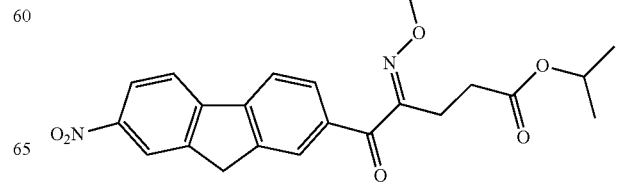

-continued
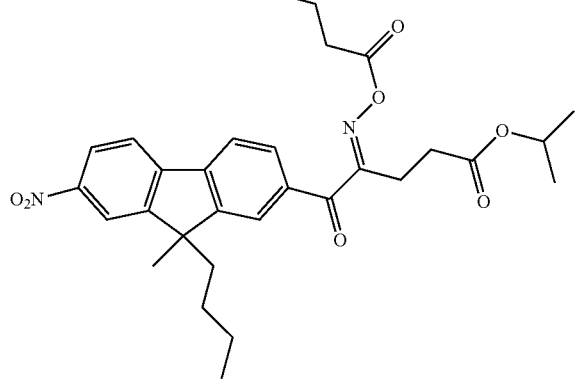
[Chem. 25]
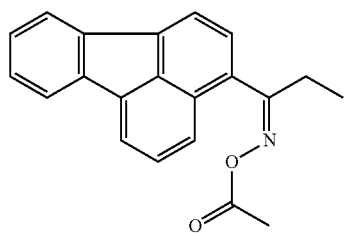
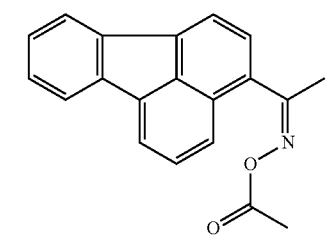
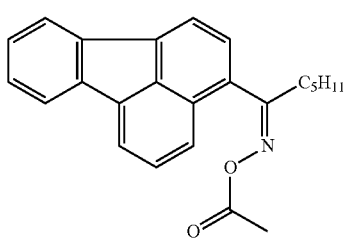
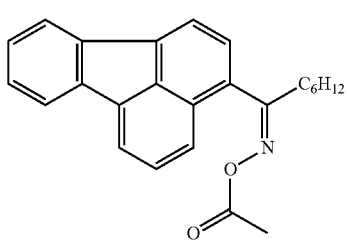
Suitable specific examples of compounds represented by the formula (c2) and having a group represented by the formula (c5) as $R^{c1}$ include the following compounds.
[Chem. 26]
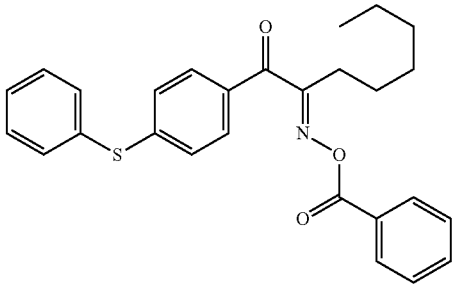
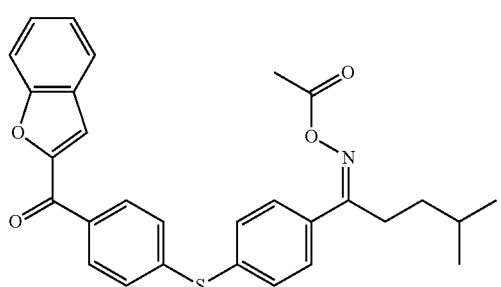
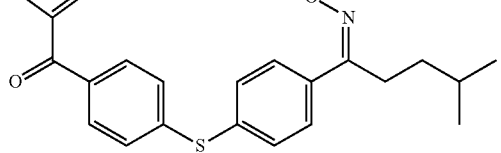
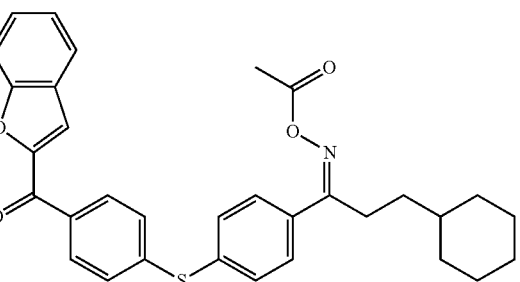
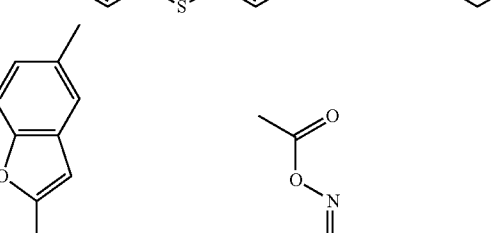
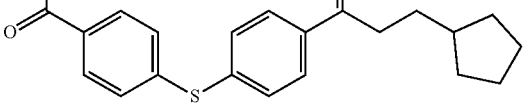

-continued

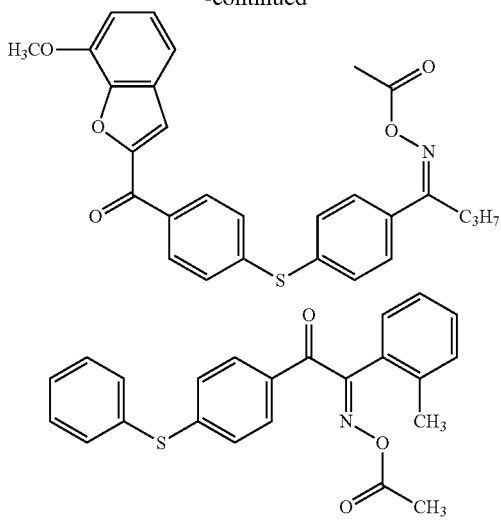

The photopolymerization initiating agent (C) is preferably a phosphine oxide compound since the curable composition has good depth curability. As the phosphine oxide compound, a phosphine oxide compound having a partial structure represented by the following formula (c9) is preferable.

[Chem. 27]

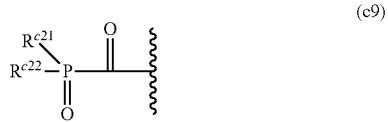

(c9)

In the formula (c9), $R^{c21}$ and $R^{c22}$ each independently is an alkyl group, a cycloalkyl group, an aryl group, an aliphatic acyl group having 2 or more and 20 or less carbon atoms, or an aromatic acyl group having 7 or more and 20 or less carbon atoms. However, $R^{c21}$ and $R^{c22}$ are not both an aliphatic acyl group or an aromatic acyl group.

The number of carbon atoms of the alkyl group as $R^{c21}$ and $R^{c22}$ is preferably 1 or more and 12 or less, more preferably 1 or more and 8 or less, and further preferably 1 or more and 4 or less. The alkyl group as $R^{c21}$ and $R^{c22}$ may be linear or branched. Specific examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a tert-pentyl group, an n-hexyl group, an n-heptyl group, an n-octyl group, a 2,4,4,-trimethyl pentyl group, a 2-ethyl hexyl group, an n-nonyl group, an n-decyl group, an n-undecyl group, an n-dodecyl group, and the like.

The number of carbon atoms of the cycloalkyl group as $R^{c21}$ and $R^{c22}$ is preferably 5 or more and 12 or less. Specific examples of the cycloalkyl group include a cyclopentyl group, a cyclohexyl group, a cycloheptyl group, a cyclooctyl group, a cyclononyl group, a cyclodecyl group, a cycloundecyl group, and a cyclododecyl group.

The number of carbon atoms of the aryl group as $R^{c21}$ and $R^{c22}$ is preferably 6 or more and 12 or less. The aryl group may have a substituent. Examples of the substituent include a halogen atom, an alkyl group having 1 or more and 4 or less carbon atoms, an alkoxy group having 1 or more and 4 or less carbon atoms, and the like. Specific examples of the aryl group include a phenyl group and a naphthyl group.

The number of carbon atoms of the aliphatic acyl group as $R^{c21}$ and $R^{c22}$ is 2 or more and 20 or less, preferably 2 or more and 12 or less, more preferably 2 or more and 8 or less, and further preferably 2 or more and 6 or less. The aliphatic acyl group may be linear or branched. Specific examples of the aliphatic acyl group include an acetyl group, a propionyl group, a butanoyl group, a pentanoyl group, a hexanoyl group, a heptanoyl group, an octanoyl group, a nonanoyl group, a decanoyl group, an undecanoyl group, a dodecanoyl group, a tridecanoyl group, a tetradecanoyl group, a pentadecanoyl group, a hexadecanoyl group, a heptadecanoyl group, an octadecanoyl group, a nonadecanoyl group, and an icosanoyl group.

The number of carbon atoms of the aromatic acyl group as $R^{c21}$ and $R^{c22}$ is 7 or more and 20 or less. The aromatic acyl group may have a substituent. Examples of the substituent include a halogen atom, an alkyl group having 1 or more and 4 or less carbon atoms, an alkoxy group having 1 or more and 4 or less carbon atoms, and the like. Specific examples of the aromatic acyl group include a benzoyl group, an o-tolyl group, an m-tolyl group, a p-tolyl group, a 2,6-dimethyl benzoyl group, a 2,6-dimethoxy benzoyl group, a 2,4,6-trimethyl benzoyl group, an α-naphthoyl group, and a β-naphthoyl group.

Preferable specific examples of the phosphine oxide compound having a structural part represented by the formula (c9) include 2,4,6-trimethyl benzoyl diphenyl phosphine oxide, bis(2,4,6-trimethyl benzoyl)-phenyl phosphine oxide, bis(2,6-dimethoxy benzoyl)-2,4,4-trimethyl-pentyl phosphine oxide, and the like.

The content of the photopolymerization initiating agent (C) is preferably 0.5% by mass or more 30% by mass or less, and more preferably 1% by mass or more 20% by mass or less with respect to the mass of curable composition (entire solid content) excluding the mass of the organic solvent (S) mentioned below. When the content of the photopolymerization initiating agent (C) is in the above range, the curable composition having good curability can be obtained.

The photopolymerization initiating agent (C) may be used in combination with a photoinitiation auxiliary agent. Examples of the photoinitiation auxiliary agent include thiol compounds such as triethanolamine, methyldiethanolamine, triisopropanolamine, methyl 4-dimethylaminobenzoate, ethyl 4-dimethylaminobenzoate, isoamyl 4-dimethylaminobenzoate, 2-ethylhexyl 4-dimethylaminobenzoate, 2-dimethylaminoethyl benzoate, N,N-dimethylpara-toluidine, 4,4'-bis(dimethylamino)benzophenone, 9,10-dimethoxyanthracene, 2-ethyl-9,10-dimethoxyanthracene, 9,10-diethoxyanthracene, 2-ethyl-9,10-diethoxyanthracene, 2-mercaptobenzothiazole, 2-mercaptobenzoxazole, 2-mercaptobenzimidazole, 2-mercapto-5-methoxybenzothiazole, 3-mercaptopropionic acid, methyl 3-mercaptopropionate, pentaerythritoltetramercaptoacetate, and 3-mercaptpropionate. These photoinitiation auxiliary agents can be used alone or in combination of two or more types thereof.

[Plasticizing Agent (D)]

The curable composition may include a plasticizing agent (D). The plasticizing agent (D) is a component that reduces the viscosity of the curable composition without largely damaging the curability of the curable composition or the refractive index of the cured product.

As the plasticizing agent (D), compounds represented by the following formula (d-1) are preferable. $R^{d1}\text{---}R^{d3}{}_r\text{---}X^d\text{---}R^{d4}{}_s\text{---}R^{d2}$ (d-1)

(in the formula (d-1), $R^{d1}$ and $R^{d2}$ each independently is a phenyl group having 1 or more and 5 or less carbon atoms which may have a substituent, the substituent is selected from an alkyl group having 1 or more and 4 or less carbon atoms, an alkoxy group having 1 or more and 4 or less carbon atoms, and a halogen atom; $R^{d3}$ and $R^{d4}$ each independently is a methylene group or an ethane-1,2-diyl group; r and s each independently is 0 or 1; and $X^d$ is an oxygen atom or a sulfur atom)

When the curable composition includes the plasticizing agent (D), viscosity of the curable composition can be reduced without damaging the curability of the curable composition and the refractive index of the cured product. From the viewpoint of reduction of the viscosity of the curable composition, the viscosity of the plasticizing agent (D) measured using the E-type viscometer at 25° C. is preferably 10 cP or less, more preferably 8 cP or less, and further preferably 6 cP or less. Furthermore, since the plasticizing agent (D) is not easily volatilized and the effect of reducing the viscosity of the curable composition is easily maintained, the boiling point of plasticizing agent (D) under atmospheric pressure is preferably 250° C. or more and more preferably 260° C. or more. The upper limit of the boiling under atmospheric pressure of the plasticizing agent (D) is not particularly limited, but it may be, for example, 300° C. or less and also 350° C. or less.

In the formula (d-1), $R^{d1}$ and $R^{d2}$ each independently is a phenyl group which may have 1 or more and 5 or less substituents. The substituent bonded to the phenyl group is a group selected from an alkyl group having 1 or more and 4 or less carbon atoms, an alkoxy group having 1 or more and 4 or less carbon atoms, and a halogen atom. When the phenyl group has a substituent, the number of substituents is not particularly limited. The number of substituents is 1 or more and 5 or less, more preferably 1 or 2, and preferably 1. From the viewpoint of reducing viscosity of the curable composition, both $R^{d1}$ and $R^{d2}$ are preferably a phenyl group which has not substituted.

Examples of the alkyl group having 1 or more and 4 or less carbon atoms as a substituent include a methyl group, an ethyl group, an n-propyl group, an isopropyl group, an n-butyl group, an isobutyl group, a sec-butyl group, and a tert-butyl group. Examples of the alkoxy group having 1 or more and 4 or less carbon atoms as a substituent include a methoxy group, an ethoxy group, an n-propyloxy group, an isopropyloxy group, an n-butyloxy group, an isobutyloxy group, a sec-butyloxy group, and a tert-butyloxy group. Examples of the halogen atom as a substituent include a fluorine atom, a chlorine atom, a bromine atom, and an iodine atom.

In the formula (d-1), $R^{d3}$ and $R^{d4}$ each independently is a methylene group or an ethane-1,2-diyl group. Furthermore, r and s each is independently 0 or 1. In the formula (d-1), $X^d$ is an oxygen atom or a sulfur atom.

Specific examples of the compound represented by the formula (d-1) described above include diphenyl ether, diphenyl sulfide, dibenzyl ether, dibenzyl sulfide, diphenethyl ether, and diphenethyl sulfide. Among them, diphenyl sulfide and/or dibenzyl ether is more preferable.

The content of the plasticizing agent in the curable composition is preferably more than 0% by mass and 35% by mass or less, and more preferably 5% by mass or more 15% by mass or less with respect to the total mass of the curable composition in terms of achieving both adjustment of viscosity and dispersibility of the metal oxide nanoparticles (B).

[Nitrogen-Containing Compound (E)]

For the purpose of easily suppressing localization of the metal oxide nanoparticles (B) in the cured product, the curable composition may include an amine compound (E1) represented by the following formula (e1) and/or an imine compound (E2) represented by the following formula (e2) as the nitrogen-containing compound (E). $NR^{e1}R^{e2}R^{e3}$ (e1)

(In the formula (e1), $R^{e1}$, $R^{e2}$, and Rea each independently is a hydrogen atom, or an organic group)

$$R^{e4}\!-\!N\!=\!CR^{e5}R^{e6} \tag{e2}$$

(In the formula (e2), $R^{e4}$, $R^{e5}$, and $R^{e6}$ each independently is a hydrogen atom or an organic group)

In the formulae (e1) and (e2), when $R^{e1}$, $R^{e2}$, $R^{e3}$, $R^{e4}$, $R^{e5}$, and $R^{e6}$ are an organic group, the organic group can be selected from various organic groups as long as the desired effect is not impaired. As the organic group, a carbon atom-containing group is preferable, and one or more carbon atoms, and a group including one or more atoms selected from the group consisting of H, O, S, Se, N, B, P, Si, and a halogen atom is more preferable. The number of carbon atoms in a carbon atom-containing group is not particularly limited, but the number is preferably 1 or more and 50 or less, and more preferably 1 or more and 20 or less. Suitable examples of the organic group include an alkyl group, a cycloalkyl group, a phenyl group which may have a substituent, a phenyl alkyl group which may have a substituent, a naphthyl group which may have a substituent, a naphthylalkyl group which may have a substituent, and a heterocyclyl group which may have a substituent, and the like.

The number of carbon atoms of the alkyl group as the organic group is preferably 1 or more and 20 or less, and more preferably 1 or more and 6 or less. The structure of the alkyl group may be linear or branched. Specific examples of the alkyl group in a case where the organic group is an alkyl group include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. Furthermore, the alkyl group may contain an ether bond (—O—) in the carbon chain. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, a methoxypropyl group, and the like.

The number of carbon atoms of the cycloalkyl group as the organic group is preferably 3 or more and 10 or less, and more preferably 3 or more and 6 or less. Specific examples of cycloalkyl group include a cyclopropyl group, a cyclobutyl group, a cyclopentyl group, a cyclohexyl group, a cycloheptyl group, a cyclooctyl group, and the like.

The number of carbon atoms of the phenyl alkyl group is preferably 7 or more and 20 or less, and more preferably 7 or more and 10 or less. Furthermore, the number of carbon atoms of the naphthylalkyl group is preferably 11 or more and 20 or less, and more preferably 11 or more and 14 or less. Specific examples of a phenyl alkyl group include a benzyl group, a 2-phenylethyl group, a 3-phenylpropyl group, and a 4-phenylbutyl group. Specific examples of a naphthylalkyl group include an α-naphthylmethyl group, a β-naphthylmethyl group, a 2-(α-naphthyl)ethyl group, and a 2-(β-naphthyl)ethyl group. A phenyl alkyl group or a naphthylalkyl group may further have a substituent on a phenyl group or a naphthyl group.

When the heterocyclyl group is as the organic group, the heterocyclyl group is the same as that in a case where $R^{c4}$ in the formula (c3) is a heterocyclyl group, and the heterocyclyl group further includes a substituent.

The heterocyclyl group as the organic group may be an aliphatic heterocyclic group or an aromatic heterocyclic group. The heterocyclyl group is preferably a 5- or 6-membered single ring including one or more N, S, and O, or a heterocyclyl group in which single rings are fused to each other, or a single ring is fused with a benzene ring. When the heterocyclyl group is a fused ring, the number of rings is 3 or less. Examples of the heterocycle constituting the heterocyclyl group include furan, thiophene, pyrrole, oxazole, isoxazole, triazole, thiadiazole, isothiazole, imidazole, pyrazole, triazole, pyridine, pyrazine, pyrimidine, pyridazine, benzofuran, benzothiophene, indole, isoindole, indolizine, benzoimidazole, benzotriazole, benzoxazole, benzothiazole, carbazole, purine, quinoline, isoquinoline, quinazoline, phthalazine, cinnoline, quinoxaline, piperidine, piperazine, morpholine, piperidine, tetrahydropyran, tetrahydrofuran, and the like.

When a phenyl group, a naphthyl group, and a heterocyclyl group included in the organic group have a substituent, examples of the substituent include an alkyl group having 1 or more and 6 or less carbon atoms, an alkoxy group having 1 or more and 6 or less carbon atoms, a halogenated alkyl group having 1 or more and 6 or less carbon atoms, a halogenated alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group which has an alkyl group having 1 or more and 6 or less carbon atoms, a dialkylamino group which has an alkyl group having 1 or more and 6 or less carbon atoms, a benzoyl group, a halogen atom, a nitro group, a cyano group, and the like. When a phenyl group, a naphthyl group, and a heterocyclyl group included in the organic group have a substituent, the number of substituents is not particularly limited, and is preferably 1 or more and 4 or less. When a phenyl group, a naphthyl group, and a heterocyclyl group included in the organic group have a plurality of substituents, the plurality of substituents may be the same as or different from each other.

In the formula (e1), $R^{e1}$, $R^{e2}$, and $R^{e3}$ each independently is a hydrogen atom or an organic group, and at least one selected from $R^{e1}$, $R^{e2}$, and Rea is an aromatic group-containing group. Furthermore, in the formula (e2), $R^{e4}$, $R^{e5}$, and $R^{de6}$ each independently is a hydrogen atom or an organic group, and at least one selected from $R^{e4}$, $R^{e5}$, and $R^{e6}$ is an aromatic group-containing group. The aromatic ring in the aromatic group-containing group may be an aromatic hydrocarbon ring, or an aromatic heterocycle. As the aromatic group-containing group, a hydrocarbon group is preferable. As the aromatic group-containing group, an aromatic hydrocarbon group (an aryl group), and an aralkyl group are preferable. Examples of the aromatic hydrocarbon group include a phenyl group, a naphthalene-1-yl group, and a naphthalene-2-yl group. Among these aromatic hydrocarbon groups, a phenyl group is preferable. Examples of the aralkyl group include a benzyl group, a 2-phenyl ethyl group, a 3-phenylpropyl group, and a 4-phenylbutyl group.

In the formula (e1), at least one selected from $R^{e1}$, $R^{e2}$, and Rea is preferably a group represented by $Ar^{e1}$—$CH_2$—. Furthermore, in the formula (e2), $R^{e4}$ is preferably a group represented by $Ar^{e1}$—$CH_2$—. $Ar^{e1}$ is an aromatic group which may have a substituent. The aromatic group as $Ar^{e1}$ may be an aromatic hydrocarbon group or an aromatic heterocyclic group. As the aromatic group as $Ar^{e1}$, an aromatic hydrocarbon group is preferable. Examples of the aromatic hydrocarbon group include a phenyl group, a naphthalene-1-yl group, and a naphthalene-2-yl group. Among these aromatic hydrocarbon groups, a phenyl group is preferable. Substituents which may be possessed by the aromatic group as $Ar^{e1}$ are the same as the substituents which may be possessed by the organic groups in the case where the organic groups as $R^{e1}$, $R^{e2}$, $R^{e3}$, $R^{e4}$, $R^{e5}$, and $R^{e6}$ are a phenyl group, a naphthyl group, and a heterocyclyl group.

Suitable examples of the amine compounds represented by the formula (e1) include triphenylamine, N,N-diphenylbenzylamine, N-phenyldibenzylamine, tribenzylamine, N,N-dimethylphenylamine, N-methyldiphenylamine, N,N-dimethylbenzylamine, N-methyldibenzylamine, N-methyl-N-benzylphenylamine, N,N-diethylphenylamine, N-ethyldiphenylamine, N,N-diethylbenzylamine, N-ethyldibenzylamine, and N-ethyl-N-benzylphenylamine.

Suitable examples of imine compounds represented by the formula (e2) include N-benzylphenylmethanimine, N-benzyldiphenylmethanimine, N-benzyl-1-phenylethanimine, and N-benzylpropane-2-imine.

The content of the nitrogen-containing compound in the curable composition is not particularly limited as long as the desired effect is not impaired. The content of the nitrogen-containing compound (E) is preferably 5% by mass or more and 25% by mass or less, and more preferably 7% by mass or more and 20% by mass or less with respect to the mass of the photopolymerizable monomer (A).

[Solvent (S)]

The curable composition may include a 5% by mass or less solvent (S) with respect to the mass of the curable composition. Types of the solvent (S) are not particularly limited, but the solvent (S) is typically an organic solvent.

Examples of the organic solvent that can be blended in the curable composition include (poly)alkylene glycol monoalkyl ethers such as ethylene glycol monomethyl ether, ethylene glycol monoethyl ether, ethylene glycol-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as diethylene glycol dimethyl ether, diethylene glycol methyl ethyl ether, diethylene glycol diethyl ether, and tetrahydrofuran; ketones such as methyl ethyl ketone, cyclohexanone, 2-heptanone, and 3-heptanone; lactic acid alkyl esters such as methyl 2-hydroxypropionate and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethoxyethyl acetate, hydroxyethyl acetate, methyl 2-hydroxy-3-methylbutanoic acid methyl, 3-methoxybutylacetate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and ethyl 2-oxobutanoate; aromatic hydrocarbons such as toluene and xylene; and amides such as N-methylpyrrolidone, N,N-dimethylformamide, and N,N-dimethylacetamide.

[Other Components]

The curable composition may include additive agents, which have been conventionally blended in photosensitive composition or ink composition, in addition to the above-described components, as long as the object of the present invention is not inhibited. Preferable additive agents to be blended in the curable composition include a dispersing agent, an adhesion promoting agent such as a silane coupling agent, an antioxidant agent, a flocculation inhibiting agent, an antifoaming agent, a surfactant, and the like. The surfactant is not particularly limited, and well-known components such as a fluorine-based surfactant and a silicon-based surfactant can be used.

[Method for Producing Curable Composition]

A curable composition is produced by mixing respective components described above in a predetermined amount, and then uniformly stirring the resulting mixture.

<Method for Producing Cured Product>

The above-described curable composition is formed into a cured product typically by a method including, molding a curable composition, preferably according to the shape of the cured product to be formed, and exposing the molded curable composition to light.

The cured product produced by the above method shows, for example, a high refractive index at a wavelength of 550 nm of preferably 1.60 or more, more preferably 1.61 or more, more preferably 1.62 or more, and particularly preferably 1.63 or more. The upper limit of the refractive index at a wavelength of 550 nm is not particularly limited, but it may be, for example, 3.0 or less, 2.5 or less, 2.0 or less, 1.9 or less, or the like. On the other hand, the cured product produced by the above method has, for example, a reflectance of preferably less than 2.5% and more preferably less than 2.0% over the entire 380 to 780 nm wavelength region. For this reason, the cured product produced by the above method is suitably used in an optical application requiring a high refractive index and suppression of reflectance increase.

For example, a film made of the cured product of the curable composition mentioned above is suitably used as a high refractive index film constituting an antireflection film or the like in various display panels such as organic EL display panels and liquid crystal display panels.

A film thickness of the high refractive index film including the cured product of the curable composition mentioned above is not particularly limited, and can be appropriately selected depending on applications. The film thickness of the high refractive index film is typically preferably 1 nm or more and 40 µm or less, and more preferably 50 nm or more and 30 µm or less.

A method for forming the curable composition is not particularly limited, and can be appropriately selected depending on the shape of the cured product. The shape of the cured product includes, although is not limited thereto, a film shape, a lens shape, a line shape, a prism shape, and the like. Among these shapes, a film shape is preferable. A method for molding the curable composition is not particularly limited. When the shape of the cured product is a lens shape or a prism shape, the curable composition may be filled in a mold according to the shape of the cured product by using a squeegee or the like. When the shape of the cured product is a line shape, a curable composition may be applied on the base material depending on the shape of the cured product. Examples of the applying method include a printing method such as an ink jet method. Examples of the method for applying the cured material to the film shape include a contact transfer type coating apparatus such as a roll coater, a reverse coater, a bar coater, and the like, and a non-contact type coating apparatus such as a spinner (rotary type coating apparatus) and a curtain flow coater. Also, the curable composition can also be applied to the film shape by a printing method such as an ink jet method.

When the curable composition includes a solvent (S), the curable composition is molded into a desired shape, and then the solvent (S) may be removed from the molded curable composition by, for example, heating.

Note here that, for example, the curable composition molded in a desired shape such as a film shape may be exposed to a degree that the curable composition is not completely cured, and then the curable composition in a semi-cured state may be shaped by a method such as an imprint method. In this case, the shaped curable composition in the semi-cured state is further exposed to light, and the curable composition is sufficiently cured to a desired degree. Furthermore, the curable composition may be applied to a 3D printing method, and a cured product having a desired shape may be formed by laminating a cured product having a thin film shape by repeating ink jet printing and curing by exposure.

As the exposure method for curing the curable composition molded by the above-described method, various methods known as curing methods of a photosensitive composition can be suitably applied. The molded curable composition is exposed to active energy rays such as ultraviolet rays or excimer laser light.

Light exposure for the molded curable composition may be position-selectively performed by a method in which exposure is performed via a mask. When exposure is position-selectively performed, exposed curable composition is developed using an organic solvent to remove an unexposed portion, and thus the patterned cured product can be formed. When developing is carried out, it is preferable that the developing solution is sufficiently removed by methods such as drying by heating after development.

By the method described above, using the above-mentioned curable composition including only a small amount of the solvent (S), a cured product having a desired shape and showing high refractive index is formed.

EXAMPLES

The present invention will be more specifically descried below by way of Examples, but the scope of the present invention is not limited to these Examples.

Examples 1 to 10 and Comparative Examples 1 and 2

In Examples and Comparative Examples, as the photopolymerizable monomer (A), the following compounds were used.

<Compound Represented by Formula (a1)>

[Chem. 28]

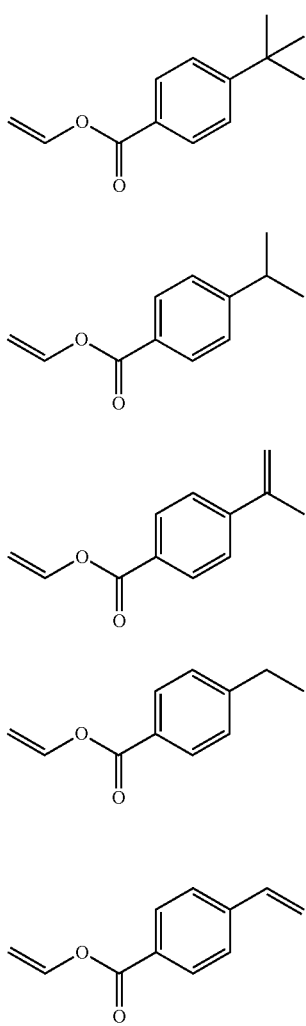

<Polyfunctional Acrylic Monomer>

A2-a: compound having the following structure.

[Chem. 29]

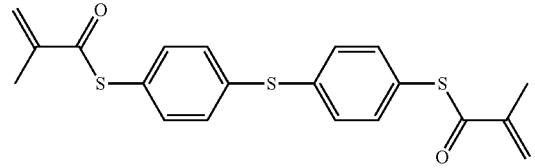

<Monofunctional Monomer>

A3-a: phenyl vinyl sulfoxide

A3-b: phenyl acrylate

In Examples and Comparative Examples, as metal oxide nanoparticles (B), zirconium oxide particles B1 (average particle diameter: 10 nm, not surface modified) were used. The zirconium oxide particles B1 were obtained by drying nanocrystals collected by centrifugation according to the method described in paragraph [0223] of Japanese Unexamined Patent Application, Publication No. 2018-193481.

In Examples and Comparative Examples, as the photopolymerization initiating agent (C), bis(2,4,6-trimethylbenzoyl)-phenyl phosphine oxide was used.

The photopolymerizable monomers (A) of types and in amounts mentioned in Table 1, metal oxide nanoparticles (B) of types and in amounts mentioned in Table 1, and the photopolymerization initiating agent (C) of types and in amounts mentioned in Table 1 were mixed uniformly to obtain the curable compositions of Examples 1 to 10 and Comparative Examples 1 and 2. Note here that the unit of the above amount is "part by mass".

<Z-Average Particle Diameter>

When the obtained curable composition was dispersed in PGMEA at the concentration of 5% by mass or less, the dispersion was monodispersion. For the obtained dispersion liquid, a Z-average particle diameter was measured by a Malvern Zetasizer Nano S (dynamic light scattering (DLS) apparatus). The results are shown in Table 2. Note here that the Z-average particle diameter measured by the DLS apparatus is a particle diameter including a monomer shell surrounding the zirconium oxide particles B1.

<Measurement Method of Refractive Index>

The curable compositions of the respective Examples and Comparative Examples were applied on a glass substrate using an inkjet apparatus. Thereafter, the coating film was exposed and cured at an exposure amount of 2 J/cm² using a 395 nm UV-LED exposure machine to obtain a cured film having a thickness of 20 μm. The refractive index of the film at a light wavelength of 550 nm was obtained using a prism coupler manufactured by Metricon Corporation. The results are shown in Table 2.

<Measurement Method of Reflectance>

Similar to the case of the measurement method of refractive index, a cured film having a thickness of 20 μm was obtained. The reflectance of the film was determined in the range of a light wavelength of 380 to 780 nm using an ultraviolet-visible near infrared spectrophotometer UH 4150 (manufactured by Hitachi High-Tech Science Corporation). The results are shown in Table 2 using the following indications. Less than 2.0%: Reflectance was less than 2.0% in all of the above ranges. Less than 2.5%: Reflectance was 2.0% or more at least in a part of the above ranges, but reflectance was less than 2.5% in all of the above ranges. 2.5% or more: Reflectance was 2.5% or more at least in a part of the above ranges.

<Overall Evaluation>

Based on the results of the above-mentioned measurement, overall evaluation was carried out according to the following criteria. The results are shown in Table 2. A: Very good, B: good, C: poor

TABLE 1

| | Photopolymerizable monomer (A) | | | | Metal oxide nanoparticles (B) | Photopolymerization initiating agent (C) |
|---|---|---|---|---|---|---|
| | Monofunctional monomer | | Polyfunctional monomer | | | |
| Example 1 | A1-a | 70 | — | 0 | 30 | 5 |
| Example 2 | A1-a | 55 | — | 0 | 35 | 5 |
| Example 3 | A1-a | 55 | — | 0 | 40 | 5 |
| Example 4 | A1-a | 55 | — | 0 | 45 | 5 |
| Example 5 | A1-a | 50 | — | 0 | 50 | 5 |
| Example 6 | A1-b | 55 | — | 0 | 40 | 5 |
| Example 7 | — | 0 | A1-c | 55 | 40 | 5 |
| Example 8 | A1-d | 55 | — | 0 | 40 | 5 |
| Example 9 | — | 0 | A1-e | 55 | 40 | 5 |
| Example 10 | A1-a | 45 | A2-a | 10 | 40 | 5 |
| Comparative Example 1 | A3-a | 55 | — | 0 | 40 | 5 |
| Comparative Example 2 | A3-b | 55 | — | 0 | 40 | 5 |

TABLE 2

| | Z-average particle diameter | Reflectance | Refractive index 550 nm | Overall evaluation | Supplementary note |
|---|---|---|---|---|---|
| Example 1 | 20 nm or less | Less than 2.0% | 1.60~1.62 | B | Refractive index decreased |
| Example 2 | 20 nm or less | Less than 2.0% | 1.63 or more | A | |
| Example 3 | 20 nm or less | Less than 2.0% | 1.63 or more | A | |
| Example 4 | 20 nm or less | Less than 2.0% | 1.63 or more | A | |
| Example 5 | 20 nm or less | Less than 2.5% | 1.63 or more | B | Reflectance increased |
| Example 6 | 20 nm or less | Less than 2.0% | 1.63 or more | A | |
| Example 7 | 20 nm or less | Less than 2.0% | 1.63 or more | A | |
| Example 8 | 20 nm or less | Less than 2.0% | 1.63 or more | A | |
| Example 9 | 20 nm or less | Less than 2.0% | 1.63 or more | A | |
| Example 10 | 20 nm or less | Less than 2.0% | 1.63 or more | A | |
| Comparative Example 1 | More than 30 nm | Not cured | Not cured | C | Not cured |
| Comparative Example 2 | 20 nm or less | 2.5% or more | 1.63 or more | C | Reflectance excessively increased |

According to Tables 1 and 2, in a curable composition including a photopolymerizable monomer (A), metal oxide nanoparticles (B), and a photopolymerization initiating agent (C), by blending a compound represented by the above formula (a1) as the photopolymerizable monomer (A), it can be found that a cured product having a high refractive index and suppressed increase in reflectance can be formed.

What is claimed is:

1. A curable composition comprising a photopolymerizable monomer (A), metal oxide nanoparticles (B), and a photopolymerization initiating agent (C),
   the photopolymerizable monomer (A) comprising a compound represented by the following formula (a1):

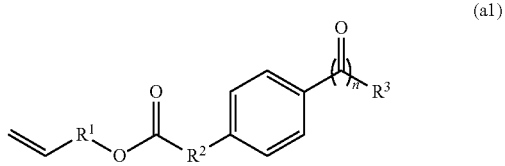

(a1)

wherein, $R^1$ and $R^2$ each independently represents a single bond or an alkylene group, $R^3$ represents an alkyl group, an alkenyl group, an alkoxy group, or a hydroxy group, and n represents 0 or 1.

2. The curable composition according to claim 1, wherein a surface of each of the metal oxide nanoparticles (B) is modified with an ethylenically unsaturated double bond-containing group.

3. The curable composition according to claim 1, wherein the photopolymerization initiating agent (C) comprises a phosphine oxide-based compound.

4. A cured product of the curable composition according to claim 1.

5. The cured product according to claim 4, wherein a refractive index measured at a light wavelength of 550 nm is 1.60 or more.

6. A method for producing a cured product, the method comprising:
   molding the curable composition according to claim 1; and
   exposing the molded curable composition to light.

7. The curable composition according to claim 1, wherein $R^3$ is an ethyl group, a propyl group, an isopropyl group, a butyl group, a tert-butyl group, an n-pentyl group, an isopentyl group, a sec-pentyl group, a tert-pentyl group, an n-hexyl group, an isohexyl group, a sec-hexyl group, a tert-hexyl group, an n-heptyl group, an n-octyl group, an alkenyl group, an alkoxy group, or a hydroxy group.

8. The curable composition according to claim 1, wherein $R^3$ is an alkenyl group or a hydroxy group.

9. The curable composition according to claim 1, wherein n is 1.

* * * * *